(12) United States Patent
Shemo et al.

(10) Patent No.: US 8,373,810 B2
(45) Date of Patent: Feb. 12, 2013

(54) OPTICAL VORTEX RETARDER MICRO-ARRAY

(75) Inventors: David M. Shemo, Windsor, CA (US); Scott McEldowney, Windsor, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 647 days.

(21) Appl. No.: 12/556,694

(22) Filed: Sep. 10, 2009

(65) Prior Publication Data

US 2010/0066929 A1 Mar. 18, 2010

Related U.S. Application Data

(60) Provisional application No. 61/096,443, filed on Sep. 12, 2008.

(51) Int. Cl.
| | |
|---|---|
| G02F 1/1335 | (2006.01) |
| G02F 1/135 | (2006.01) |
| G02F 1/1337 | (2006.01) |
| G02F 1/13 | (2006.01) |
| H01L 21/00 | (2006.01) |

(52) U.S. Cl. ............. 349/18; 349/4; 349/25; 349/125; 349/129; 349/188; 349/191; 349/193; 438/30

(58) Field of Classification Search .......... 349/4, 18, 349/24, 25, 35, 123–127, 129, 180, 181, 349/187, 188, 191, 193; 430/20; 438/30; 850/8–10, 18, 60–63
See application file for complete search history.

(56) References Cited

U.S. PATENT DOCUMENTS

| | | | |
|---|---|---|---|
| 5,861,931 A | 1/1999 | Gillian et al. ............ 349/129 |
| 6,046,787 A | 4/2000 | Nishiguchi ............ 349/129 |
| 6,541,185 B1 | 4/2003 | Matsunaga et al. ......... 430/321 |
| 6,597,856 B2 | 7/2003 | Van De Witte et al. ....... 385/141 |
| 6,624,863 B1 | 9/2003 | Jacobs et al. ............ 349/126 |
| 6,735,017 B1 | 5/2004 | Acosta et al. ............ 359/497 |
| 6,867,836 B2 | 3/2005 | Stalder et al. ............ 349/129 |
| 6,927,823 B1 | 8/2005 | Reznikov et al. .......... 349/124 |
| 7,176,445 B2 * | 2/2007 | Curtis et al. ............ 250/221 |
| 7,196,758 B2 | 3/2007 | Crawford et al. .......... 349/129 |
| 7,364,671 B2 | 4/2008 | Schadt et al. ............ 252/299.1 |
| 7,375,784 B2 | 5/2008 | Smith et al. ............ 349/129 |
| 7,411,645 B2 | 8/2008 | Kashima ............ 349/129 |
| 7,471,362 B1 * | 12/2008 | Jones ............ 349/129 |
| 2005/0042391 A1 | 2/2005 | Ryan et al. ............ 428/1.1 |
| 2007/0115551 A1 | 5/2007 | Spilman et al. ........... 359/494 |
| 2007/0134442 A1 | 6/2007 | Matsunaga et al. ......... 428/1.3 |
| 2009/0009668 A1 | 1/2009 | Tan et al. ............ 349/1 |
| 2009/0141226 A1 | 6/2009 | Kataoka et al. ........... 349/123 |

OTHER PUBLICATIONS

European Search Report from corresponding EP application No. 09169304.4.
Eakin et al., "Single Step Surface Alignment Patterning in Liquid Crystals Using Polarization Holography Exposure", SID 06 Digest, 875-8. 2006 SID.

(Continued)

*Primary Examiner* — Mark Robinson
*Assistant Examiner* — Paisley L Arendt
(74) *Attorney, Agent, or Firm* — Matthew A. Pequignot; Pequignot + Myers LLC

(57) ABSTRACT

A micro-array of optical vortex retarders is provided by forming an alignment layer having a plurality of discrete alignment patches with different orientations. A layer of birefringent material, including one of a liquid crystal and a liquid crystal polymer precursor material, is provided adjacent to the alignment layer. The aligning orientation and position of each discrete alignment patch in the plurality of discrete alignment patches is selected to induce the layer of birefringent material to form at least one optical vortex retarder adjacent to a substantially non-oriented region of the alignment layer.

22 Claims, 18 Drawing Sheets

OTHER PUBLICATIONS

K. Ladavac et al., "Microoptomechanical pump assembled and driven by holographic optical vortices," Opt. Express 12, 1144-1149, 2004.

Gibson et al, "Free-space information transfer using light beams carrying orbinatl angular momentum", Optics Express, vol. 12, No. 22, pp. 5448-5456, 2004.

McEldowney et al., "Creating vortex retarders using photoaligned liquid crystal polymers," Opt. Lett. vol. 33, 134-136, 2008.

McEldowney et al., "Vortex retarders produced from photo-aligned liquid crystal polymers", vol. 16, 7295-7308, 2008.

Levenson et al., "Optical vortex mask via levels," J. Microlithogr., Microfab., Microsyst. 3, 293-304, 2004.

J. Masajada, "Small rotation-angle measurement with optical vortex interferometer," Opt. Commun. 239, 373-381, 2004.

Schadt et al., "Optical patterning of multidomain liquid-crystal displays with wide viewing angles" Nature, V 381, 6579, 212-215, 1996.

Newsome et al., "Laser etched gratings on polymer layers for alignment of liquid crystals" Applied Physics Letters, V72, 17, pp. 2078-2080, 1998.

Hasegawa, "Fabrication of Freely Patterned Aligned Nematic Liquid Crystal Cells Using UV Laser Scanning Photoalignment" Jpn. J. Appl. Phys., 41, pp. L201-L202, 2002.

Lee et al., "Alignment of Liquid Crystals with Patterned Isotropic Surfaces", Science, vol. 291. No. 5513, pp. 2576-2580, 2001.

Kim et al, "Surface alignment bistability of nematic liquid crystals by orientationally frustrated surface patterns" Applied Physics Letters, 78, pp. 3055-3057, 2001.

Kim et al, "Tristable nematic liquid crystal device using micropatterned surface alignment" Nature 429, pp. 159-162, 2002.

Ong et al., "Alignment of nematic liquid crystals by inhomogeneous surfaces", Journal of Applied Physics, 57, pp. 186-192, 1985.

* cited by examiner m = 1 m = 2 m = −1 m = −2

OPTICAL VORTEX RETARDER MICRO-ARRAY

CROSS-REFERENCE TO RELATED APPLICATIONS

This application claims priority from U.S. Provisional Application No. 61/096,443, filed Sep. 12, 2008, which is hereby incorporated by reference.

MICROFICHE APPENDIX

Not Applicable.

TECHNICAL FIELD

The present application relates generally to optical vortex retarders and in particular to a micro-array of optical vortex retarders and a method of making the same.

BACKGROUND OF THE INVENTION

A waveplate alters polarized light by adding a predetermined phase shift between two orthogonal polarization components of the polarized light field. Conventionally, the added phase shift is referred to as the waveplate retardance and is measured in fractions of a wavelength for normal incident light. For example, a waveplate that adds a phase shift of $\pi$ between the orthogonal polarizations is referred to as a half-wave plate, whereas a waveplate that adds a phase shift of $\pi/2$ is referred to as a quarter-wave plate.

Traditionally waveplates have been fabricated using uniaxial birefringent materials. A uniaxial birefringent material has two principal refractive indices, namely an ordinary refractive index $n_o$ and extraordinary refractive index $n_e$, where the birefringence is defined as $\Delta n = n_e - n_o$. In a waveplate, the axis having the low refractive index is termed the fast axis, whereas the axis having the higher refractive index is termed the slow axis and is at a right angle to the fast axis. For example, for a positive uniaxial birefringent material, where $n_e > n_o$, the extraordinary axis is the slow axis whereas the ordinary axis is the fast axis. The extraordinary axis is also the optic axis, which is understood to be the direction in which linearly polarized light propagates through the medium with the same speed, regardless of its state of polarization. In order to provide the required phase shift, the optic axis of uniaxial birefringent materials used in the fabrication of conventional waveplates is typically oriented at a non-normal angle to the plane of the waveplate. For example, waveplates are often fabricated from a uniaxial birefringent material having its optic axis parallel to the plane of the waveplate (i.e., termed an A-plate) or at an oblique angle to plane of the substrate (i.e., termed an O-plate). Alternatively, a waveplate may be fabricated from a uniaxial birefringent material having its optic axis normal to the plane of the waveplate (i.e., termed a C-plate) such that its retardance increases with angle of incidence (AOI).

One important application of waveplates is to alter the polarization state of polarized light travelling through it. For example, half-wave plates can be used to rotate the orientation of linearly polarized, whereas quarter-wave plates can be used to convert linearly polarized light to circularly polarized. With regard to the former, the rotation angle is $2\theta$ when the incident light's polarization direction is oriented at $\theta$ to the optic axis in the plane of the waveplate. With regard to the latter, the incident light's polarization direction is typically oriented at 45 degrees to the optic axis in the plane of the waveplate. In each case, it is preferred that the optic axis of the waveplate be spatially uniform (i.e., non-varying across a surface of the waveplate such that the entire surface of the waveplate has the same optic axis orientation) in order to provide uniformly-polarized beams (i.e., beams of polarized optical radiation in which the polarization does not vary across the beams' cross-section), assuming the incident polarization state is also uniform across it's cross section.

More recently, it has been recognized that inducing spatial polarization variations across a uniformly polarized beam is an invaluable wavefront shaping tool. In fact, if such a beam with space-variant polarization is analyzed using a linear polarizer, the net effect is the addition of a spatially-variant phase shift, known as the Pancharatnam-Berry phase, across the beam's cross-section. Some examples of light beams having a spatially-varying linear polarization are radially-polarized and azimuthally-polarized (i.e., tangentially-polarized) light beams, in which the local axis of polarization is either radial, that is, parallel to a line connecting a local point to a center point, or tangential, that is, perpendicular to that line. The polarization patterns of these beams are illustrated in FIG. 1, wherein arrows schematically show local orientations of the beam polarization.

Whether the beam is radially or azimuthally polarized, its polarization direction depends on an azimuth angle of a particular spatial location and does not depend on the radial distance from the center point. These types of polarized beams are sometimes referred to as cylindrical vector beams or polarization vortex beams. The term "polarization vortex" is related to the term "optical vortex". An optical vortex is a point in a cross-section of a beam that exhibits a phase anomaly so that the electrical field of the beam radiation evolves through a multiple of $\pi$ in any closed path traced around that point. Similarly, a polarization vortex is a linearly polarized state in which the direction of polarization evolves through a multiple of $\pi$ about the beam axis. Such a beam, when focused, adopts a zero intensity at the center point (e.g., along the beam's axis if the vortex is centered within the beam). Polarization vortex beams have a number of unique properties that can be advantageously used in a variety of practical applications such as particle trapping (optical tweezers), microscope resolution enhancement, and photolithography.

One method of obtaining a polarization vortex beam is to pass a uniformly polarized optical beam through an optical vortex retarder. An optical vortex retarder, which is also referred to herein simply as a vortex retarder, refers to a class of waveplates that has a spatially varying fast axis that rotates around a point. More specifically, an azimuthal angle of the fast axis rotates about a point. If the optical retarder is an achromatic retarder (e.g., a multi-layer design wherein two or more retarders are stacked or laminated in order to make the optical retarder achromatic) then the spatially varying fast axis is the effective fast axis (i.e., the orientation that would appear to the be fast axis if multi-layer retarder were assumed to be a single layer of birefringent material). The term "azimuthal angle" refers to the azimuthal orientation of the axis projected in the plane of the optical retarder, measured relative to some arbitrary reference point. Note that while the azimuthal angle of the fast axis of a vortex retarder rotates about a point, the polar angle of the fast axis is typically constant across a surface of the retarder (i.e., vortex retarders typically have a spatially uniform retardance). The term "polar angle" refers to the out-of-plate tilt of the fast axis.

In general, the spatially varying fast axis azimuth of a vortex retarder will vary with azimuthal location on the vortex retarder in a predetermined relationship. For example, referring to FIG. 2, the spatially varying fast axis azimuth θ typically varies with azimuthal location φ according to:

$$\theta(\phi) = \alpha\phi + \theta(0) \quad (1)$$

where α is a constant equal to the rate of change in fast axis azimuth with respect to azimuthal location. Note that both the fast axis azimuth θ and the azimuthal location φ are measured relative to a predetermined reference point (e.g., shown as the x-axis). The fast axis azimuth at this reference point is θ(0). When θ(0)=90 degrees as illustrated in FIG. 3A the fast axis is said to be tangentially-aligned. When θ(0)=0 degrees as illustrated in FIG. 3B the fast axis is said to be radially-aligned.

Referring again to Equation (1), the spatially varying fast axis θ will be only continuous at all φ if α=m/2, where m is an integer referred to as the mode of the vortex retarder. In fact, vortex retarders are often characterized according to their mode (e.g., m=2α). For example, the vortex retarders illustrated in FIGS. 3A and 3B are m=2 vortex retarders. Notably, m=2 vortex retarders (e.g., wherein α=1) correspond to the special case wherein a 1 degree counter clockwise rotation in azimuthal location corresponds to a 1 degree increase in fast axis azimuth orientation. In contrast, in a m=−2 vortex retarder (e.g., wherein α=−1) a 1 degree counter clockwise rotation in azimuthal location corresponds to a 1 degree decrease in fast axis azimuth orientation. FIG. 4 shows examples of vortex retarders having modes equal to 1, −1, 2, and −2.

Vortex retarders have been fabricated using a series of birefringent crystals, stress induced birefringence, nanostructures, liquid crystals (LC), and liquid crystal polymers (LCP). The use of LC and LCP for fabricating vortex retarders is advantageous because the resulting vortex retarders are useful in the visible wavelength range and have a continuously varying fast axis. Moreover, both LC and LCP materials can be aligned using a linear photopolymerizable polymer (LPP) layer, which is photosensitive to linearly polarized ultraviolet (LPUV) light. More specifically, the LPP layer is selectively polymerized in the direction parallel to LPUV light. Accordingly, a vortex retarder can be fabricated by rotating at least one of the substrate supporting the LPP layer and an orientation of the LPUV light. For example, the fabrication of vortex retarders using LCP has been described in S. C. McEldowney, D. M. Shemo, R. A. Chipman, and P. K. Smith, "Creating vortex retarders using photoaligned liquid crystal polymers," Opt. Lett. Vol. 33, 134-136 (2008) and Scott C. McEldowneyl, David M. Shemo, and Russell A. Chipman "Vortex retarders produced from photo-aligned liquid crystal polymers", Vol. 16, 7295-7308, 2008, both of which are incorporated herein by reference.

While rotating the substrate and/or the orientation of the LPUV light while irradiating the LPP layer has been shown to provide improved vortex retarders, the method is limited to making single vortex retarders.

In J. N. Eakin and G. P. Crawford, "Single step surface alignment patterning in liquid crystals using polarization holography exposure", SID 06, p 875, a holographic exposure technique is used to create a plurality of relatively small vortex retarders, each of which has a spatially varying fast axis that rotates about a different point. More specifically, the plurality of relatively small vortex retarders, which is configured as a two-dimensional array, is created by patterning a LPP layer using the interference pattern generated by the holographic exposure. While the two-dimensional patterning of the LPP layer is conveniently performed with a single step, it is, unfortunately, a relatively complex procedure relying on the interference of four non-coplanar coherent laser beams. In addition, since the interference pattern is used to provide the two-dimensional patterning it is difficult to control and optimize the process, and in particular, the size of the array, which is limited by the laser spot size and optics. Moreover, using the interference pattern to provide the two-dimensional patterning introduces intensity modulations which may negatively affect the spatially uniform out-of-plane tilt of the spatially varying fast axis.

SUMMARY OF THE INVENTION

The instant invention relates to a micro-array of optical vortex retarders and a method of making the same, wherein the optical vortex retarders are formed using an alignment layer having a plurality of discrete alignment regions (e.g., patches) interspersed in a substantially non-aligned area. Each of the discrete alignment areas, or patches, is strategically oriented, sized, shaped, and/or located to induce the adjacent LC or LCP layer to form a periodic arrangement of optical vortex retarders. Each optical vortex retarder is formed in the LC or LCP layer next to the interstitial regions between the discrete alignment patches.

In accordance with one aspect of the instant invention there is provided a method of making an optical vortex retarder comprising: forming an alignment layer having a first plurality of discrete alignment patches, the first plurality of discrete alignment patches including a first alignment patch having a first aligning orientation and a second alignment patch having a second other aligning orientation; and providing a layer of birefringent material adjacent to the alignment layer, the birefringent material including one of a liquid crystal and a liquid crystal polymer precursor material, wherein an aligning orientation and position of each discrete alignment patch in the first plurality of discrete alignment patches is selected to induce the layer of birefringent material to form at least one optical vortex retarder adjacent to a substantially non-oriented region of the alignment layer.

In accordance with another aspect of the instant invention there is provided an optical vortex retarder array comprising: a layer of birefringent material disposed adjacent to an alignment layer, the birefringent material including one of a liquid crystal and a liquid crystal polymer precursor material, the alignment layer having a plurality of discrete alignment patches, the plurality of discrete alignment patches including a first alignment patch having a first aligning orientation and a second alignment patch having a second other aligning orientation, wherein an aligning orientation and position of each discrete alignment patch in the plurality of discrete alignment patches is selected to induce the layer of birefringent material to form the optical vortex retarder array.

In accordance with one aspect of the instant invention there is provided a method for making a micro-array of optical vortex retarders comprising the steps of: a) providing a substrate, b) disposing an alignment layer on the substrate; c) patterning the alignment layer with an array of alignment patches; and d) disposing a liquid crystal layer on the alignment layer containing the array alignment patches, wherein each alignment patch in the array has a predetermined alignment direction that tends to locally orient a liquid crystal director of the overlying liquid crystal layer, wherein the array of alignment patches is interspersed in a substantially non-oriented region of the alignment layer, and wherein the array of alignment patches is distributed with a periodicity selected such that the locally oriented liquid crystal director induce the liquid crystal layer to form the micro-array of vortex retarders above the substantially non-oriented region of the alignment layer.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
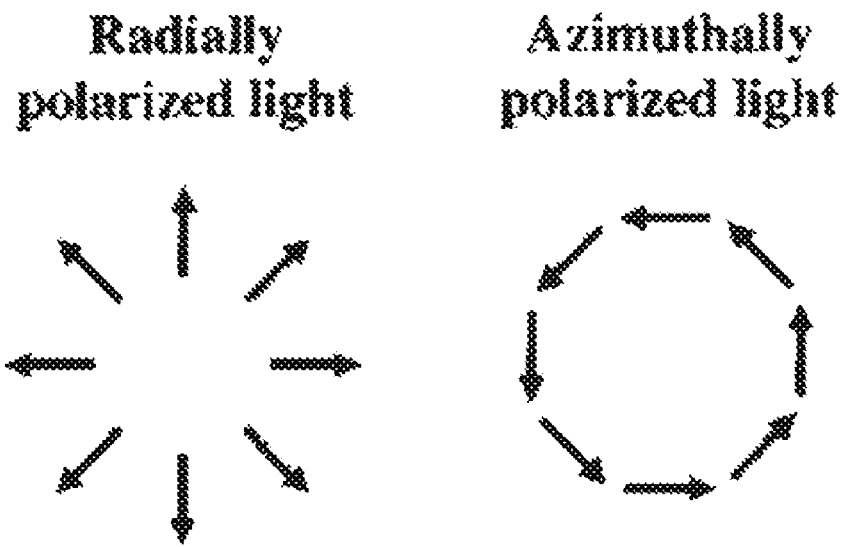
FIG. 1 is a schematic diagram illustrating a radially polarized light beam (left) and an azimuthally polarized light beam (right)
Figure 2:
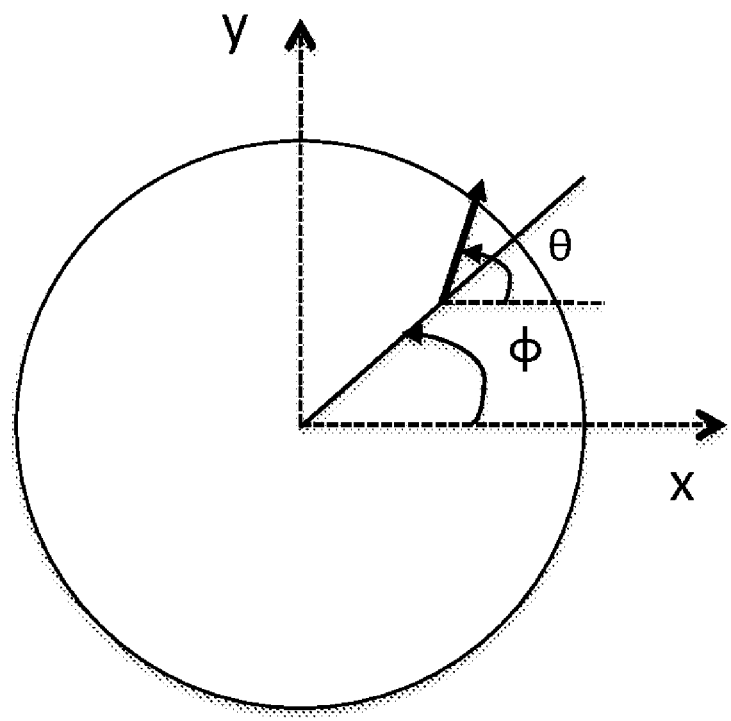
FIG. 2 is a schematic diagram showing the fast axis azimuth orientation θ of an optical vortex retarder at one azimuthal location ϕ.
Figure 3A:
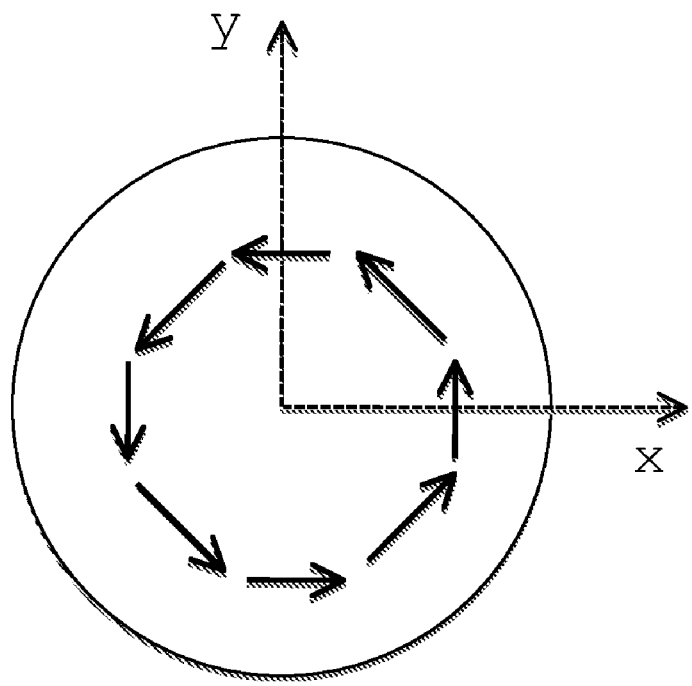
FIG. 3A is a schematic diagram of an optical vortex retarder having a tangentially aligned fast axis.
Figure 3B:
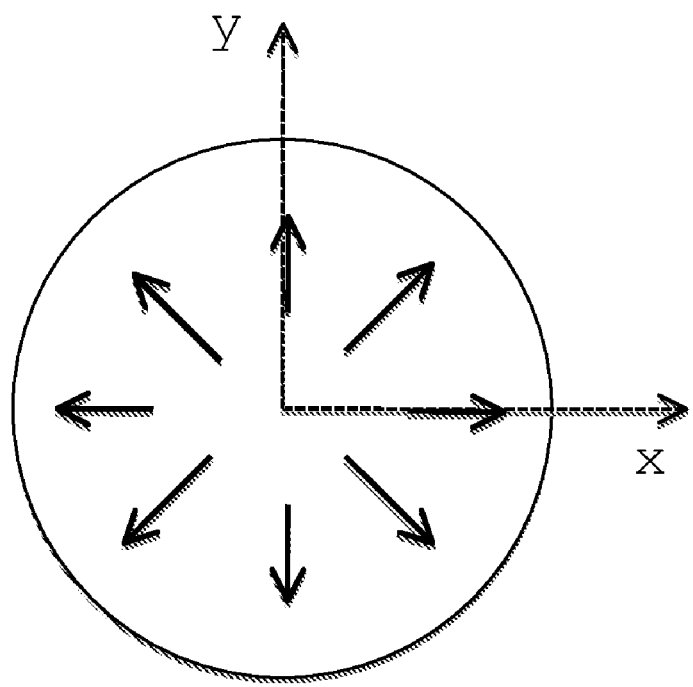
FIG. 3B is a schematic diagram of an optical vortex retarder having a radially aligned fast axis.
Figure 4:
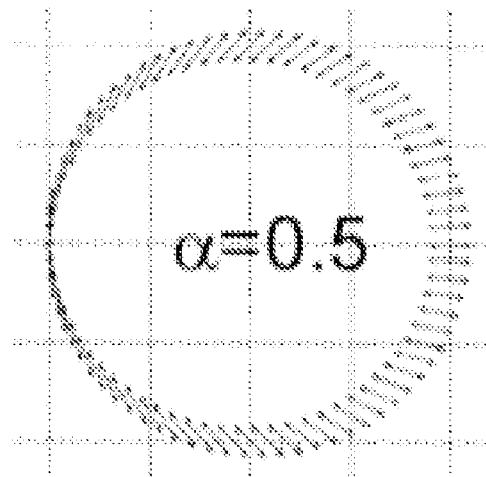
FIG. 4 shows examples of optical vortex retarders having modes equal to 1, 2, −1, and −2.
Figure 4:
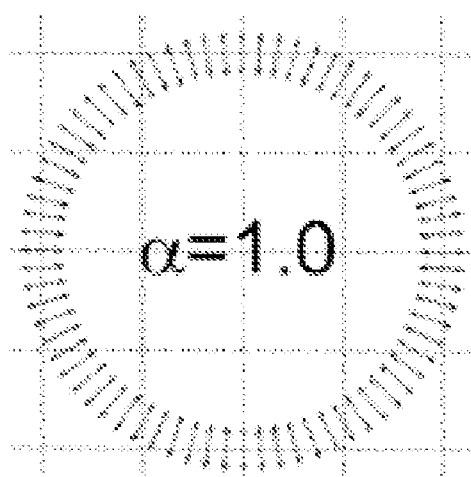
Figure 4:
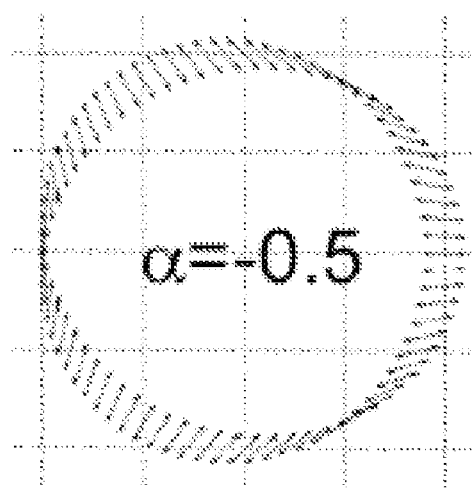
Figure 4:
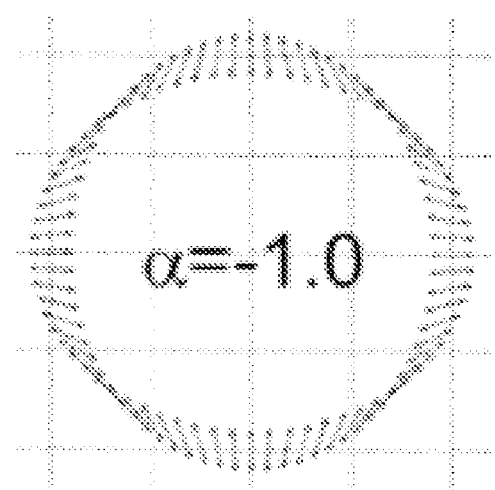
Figure 5A:
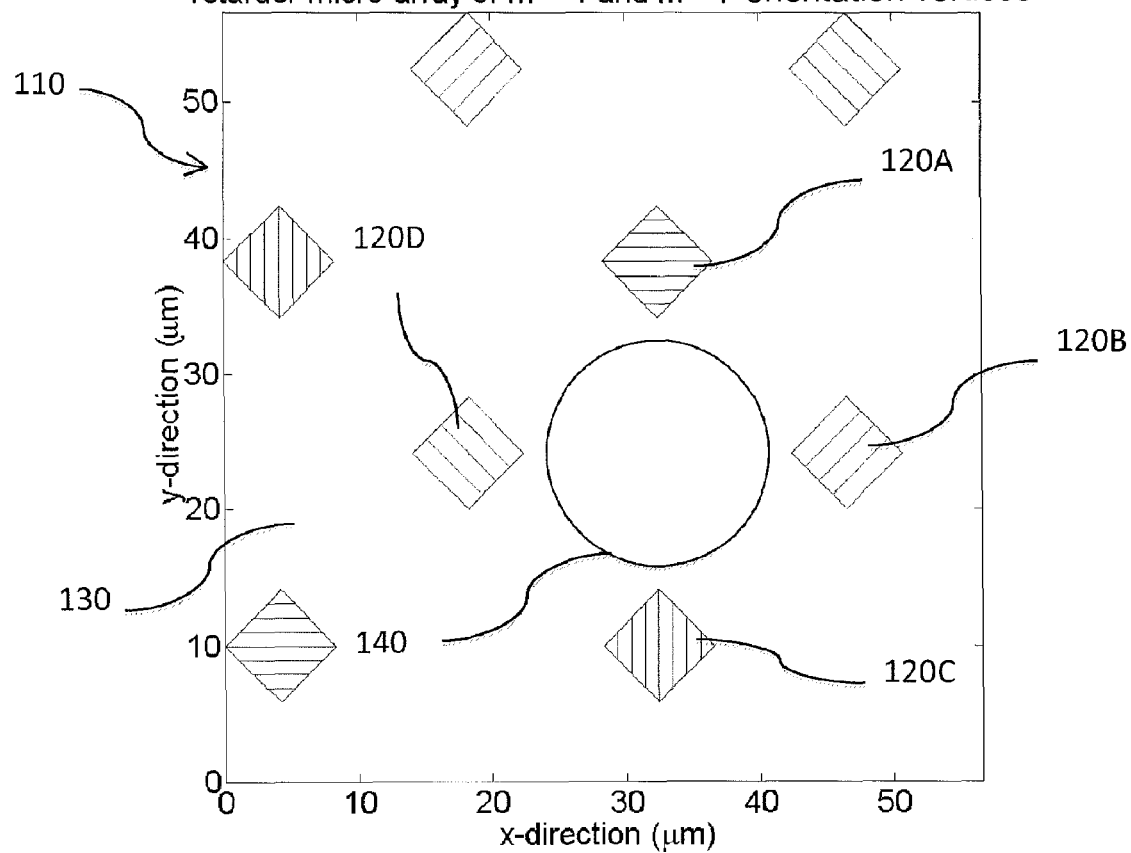
FIG. 5A illustrates one embodiment of an alignment pattern for producing an array of m=±1 vortices, wherein the orientation in each patch is indicated by the lines drawn within it.

Referring to FIG. 5A, there is shown a schematic diagram of an alignment layer for creating an array of optical vortex retarders in an adjacent LC or LCP layer, in accordance with one embodiment of the instant invention. The alignment layer 110 includes a plurality of discrete alignment areas or patches 120A, 120B, 120C, 120D interspersed in a substantially non-oriented region 130. Each alignment patch 120A, 120B, 120C, 120D has a fixed aligning orientation that differs from the fixed aligning orientation of one or more other alignment patches. In particular, the plurality of discrete alignment patches 120A, 120B, 120C, 120D includes four different aligning orientations. For example, alignment patch 120A has a fixed aligning orientation that is at 0 degrees, whereas alignment patch 120C has a fixed aligning orientation at 90 degrees, each measured with respect to the x-axis. The plurality of discrete alignment patches 120A, 120B, 120C, 120D is arranged in a predetermined finely-pitched 2D pattern so that the fixed aligning orientations alternate in some periodic manner. For example, referring to discrete alignment patches 120B and 120D the fixed aligning orientation alternates between orthogonal orientations in a direction parallel to the x-axis. Notably, the area between the discrete alignment patches (e.g., the substantially non-oriented region 130), including the interstitial region 140, has no preferred aligning orientation.

Figure 5B:
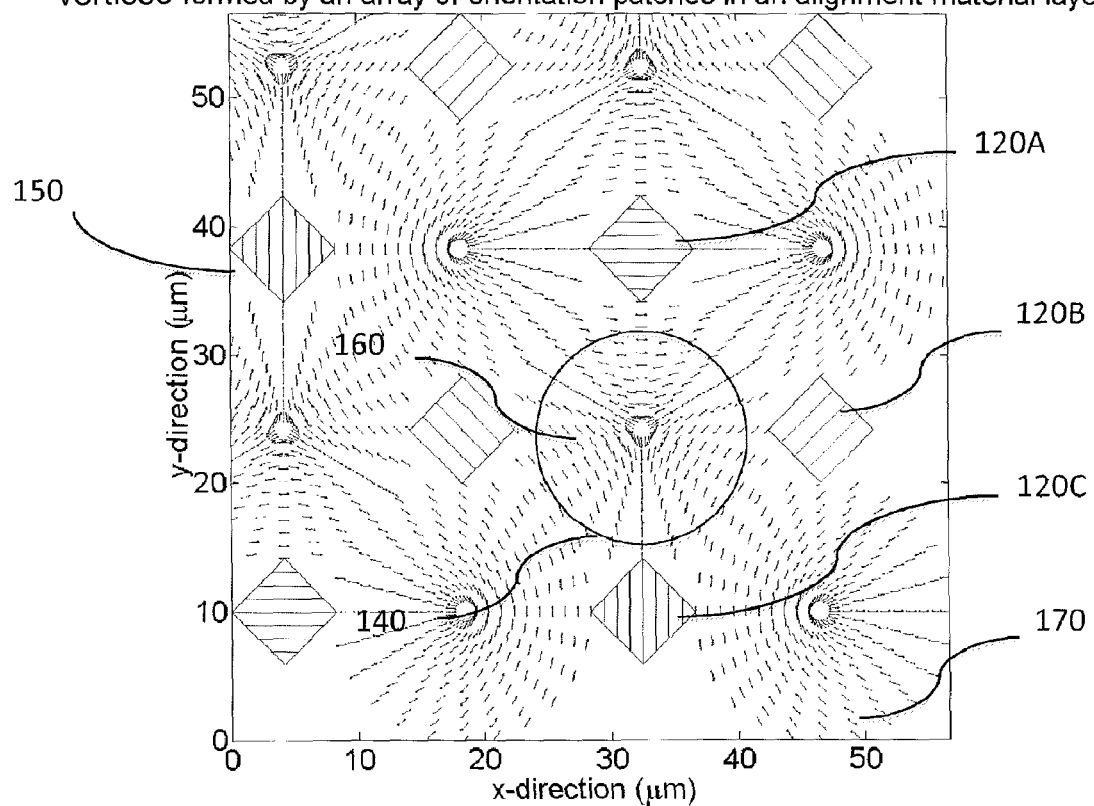
FIG. 5B illustrates an embodiment of an array of m=±1 optical vortex retarders formed in a LC or LCP layer using the alignment pattern illustrated in FIG. 5A, wherein the "vector lines" represent an axis (i.e. fast axis or slow axis) of the birefringent material (e.g., LC or LCP layer), and wherein the underlying alignment pattern is shown for reference purposes.

Referring also to FIG. 5B, each of the discrete alignment patches 120A, 120B, 120C, 120D is strategically oriented, sized, shaped, and/or located to cause the LC or LCP precursor layer 150 disposed above the alignment layer 110 to create an array of optical vortex retarders. In particular, each discrete alignment patch 120A, 120B, 120C, 120D is used to locally anchor the alignment of the overlying/adjacent LC or LCP precursor layer 150 and to induce the LC or LCP material adjacent the non-oriented interstitial region 140 to form a vortex retarder 160. Although the LC or LCP material 150 over each alignment patch 120A, 120B, 120C, 120D generally has the same orientation as the underlying alignment patch, some deviation is expected near the patch edges so that there is a smooth fast axis transition at the patch boundaries. Notably, this pattern of alignment patches is shown to create an array of m=1 and m=−1 optical vortex retarders. For example, optical vortex retarder 160 is an m=−1 vortex retarder, whereas optical vortex retarder 170 is an m=1 optical vortex retarder.

Figure 6A:
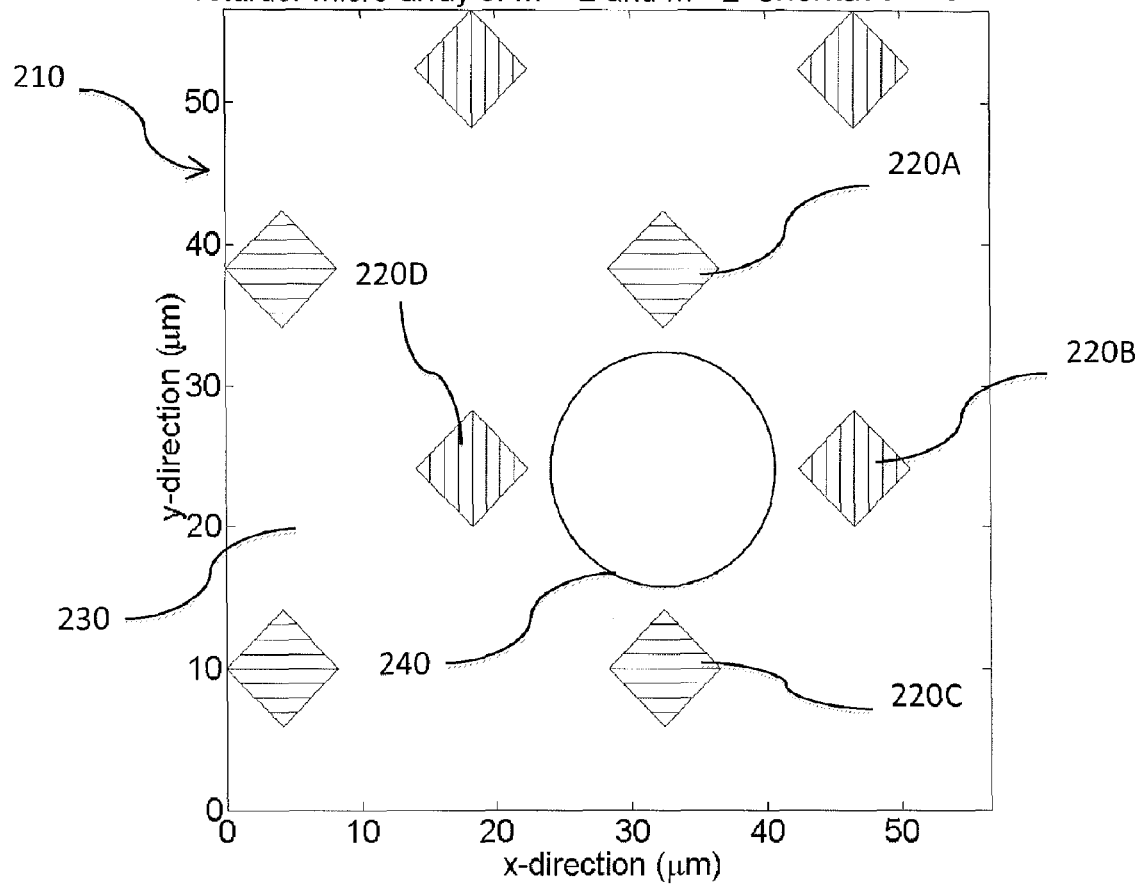
FIG. 6A illustrates one embodiment of an alignment pattern for producing an array of m=±2 vortices, wherein the orientation in each patch is indicated by the lines drawn within it.

Referring to FIG. 6A, there is shown a schematic diagram of an alignment layer for creating an array of optical vortex retarders in an adjacent LC or LCP layer, in accordance with another embodiment of the instant invention. The alignment layer 210 includes a plurality of discrete alignment areas or patches 220A, 220B, 220C, 220D interspersed in a substantially non-oriented region 230. Each alignment patch 220A, 220B, 220C, 220D has a fixed aligning orientation that differs from the fixed aligning orientation of one or more other alignment patches. In particular, the plurality of discrete alignment patches 220A, 220B, 220C, 220D includes two different aligning orientations. For example, alignment patch 220A has a fixed aligning orientation that is at 0 degrees, whereas alignment patch 220B has a fixed aligning orientation at 90 degrees. The plurality of discrete alignment patches 220A, 220B, 220C, 220D is arranged in a predetermined finely-pitched 2D pattern so that the fixed aligning orientations alternate in some periodic manner. In particular, the fixed aligning orientations alternate in a checker board fashion. Notably, the area between the discrete alignment patterns (e.g., the substantially non-oriented region 230), including the interstitial region 240, has no preferred aligning orientation.

Figure 6B:
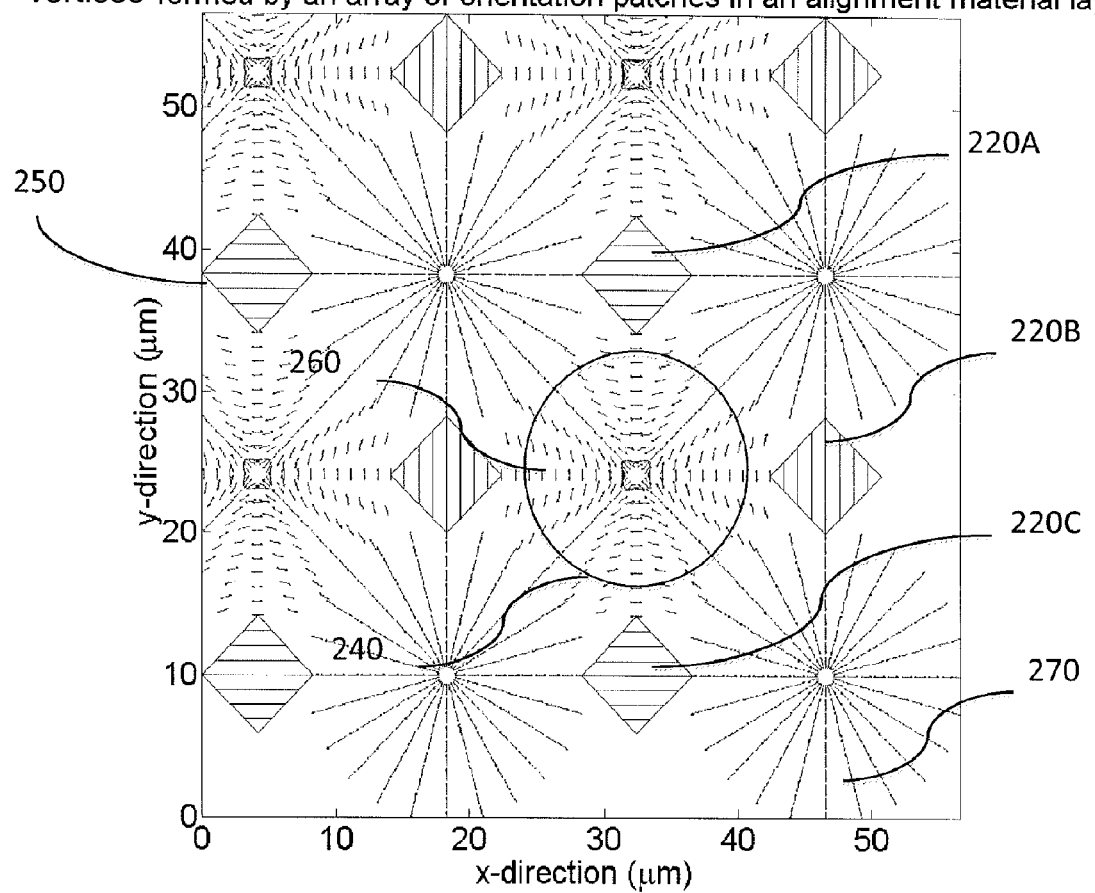
FIG. 6B illustrates an embodiment of an array of m=±2 optical vortex retarders formed in a LC or LCP layer using the alignment pattern illustrated in FIG. 6A, wherein the "vector lines" represent an axis (i.e. fast axis or slow axis) of the birefringent material (e.g., LC or LCP layer), and wherein the underlying alignment pattern is shown for reference purposes.

Referring also to FIG. 6B, each of the discrete alignment patches 220A, 220B, 220C, 220D is strategically oriented, sized, shaped, and/or located to cause the LC or LCP precursor layer 250 disposed above the alignment layer 210 to create an array of optical vortex retarders. For example, each of the discrete alignment patches 220A, 220B, 220C, 220D is used to locally anchor the alignment of the overlying/adjacent LC or LCP precursor layer 250 such that the orientation of the LC or LCP material over/adjacent to the interstitial region 240 is forced to create a vortex retarder 260. Although the LC or LCP material 250 over each alignment patch 220A, 220B, 220C, 220D generally has the same orientation as the underlying alignment patch, some deviation is expected near the patch edges so that there is a smooth fast axis transition at the patch boundaries. Notably, this pattern of alignment patches is shown to create an array of m=2 and m=−2 optical vortex retarders. For example, optical vortex retarder 260 is an m=−2 vortex retarder, whereas optical vortex retarder 270 is an m=2 optical vortex retarder.

Figure 7A:
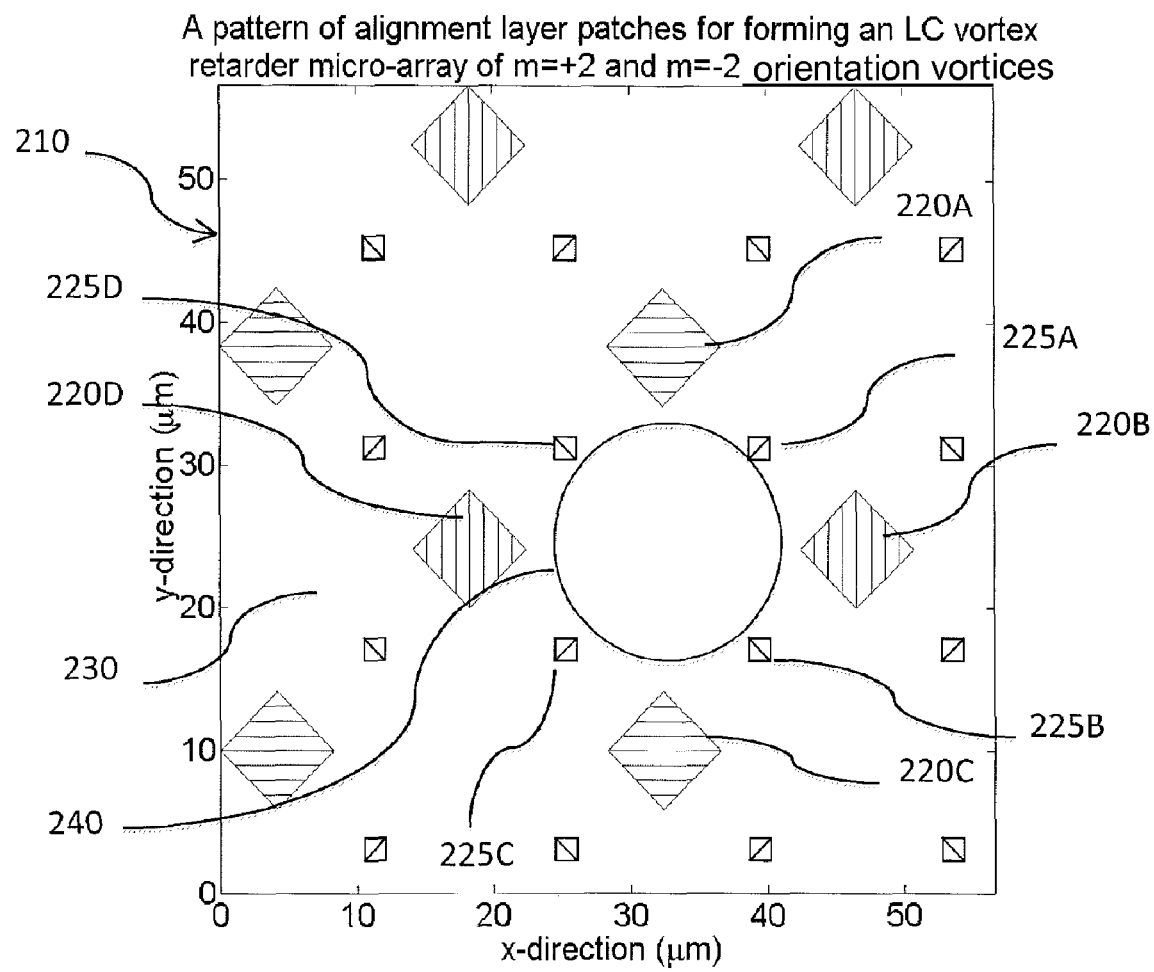
FIG. 7A illustrates one embodiment of an alignment pattern for producing an array of m=±2 vortices including a secondary set of alignment patches, wherein the orientation in each patch is indicated by the lines drawn within it.

Referring to FIG. 7A, there is shown a schematic diagram of an alignment layer for creating an array of optical vortex retarders in an adjacent LC or LCP layer, in accordance with yet another embodiment of the instant invention. In addition to the first plurality of discrete alignment areas or patches 220A, 220B, 220C, 220D described above, the alignment layer 210 further includes a second plurality of discrete alignment areas or patches 225A, 225B, 225C, 225D, which are smaller than the first plurality 220A, 220B, 220C, 220D, and which are also interspersed in the substantially non-oriented region 230.

Figure 7B:
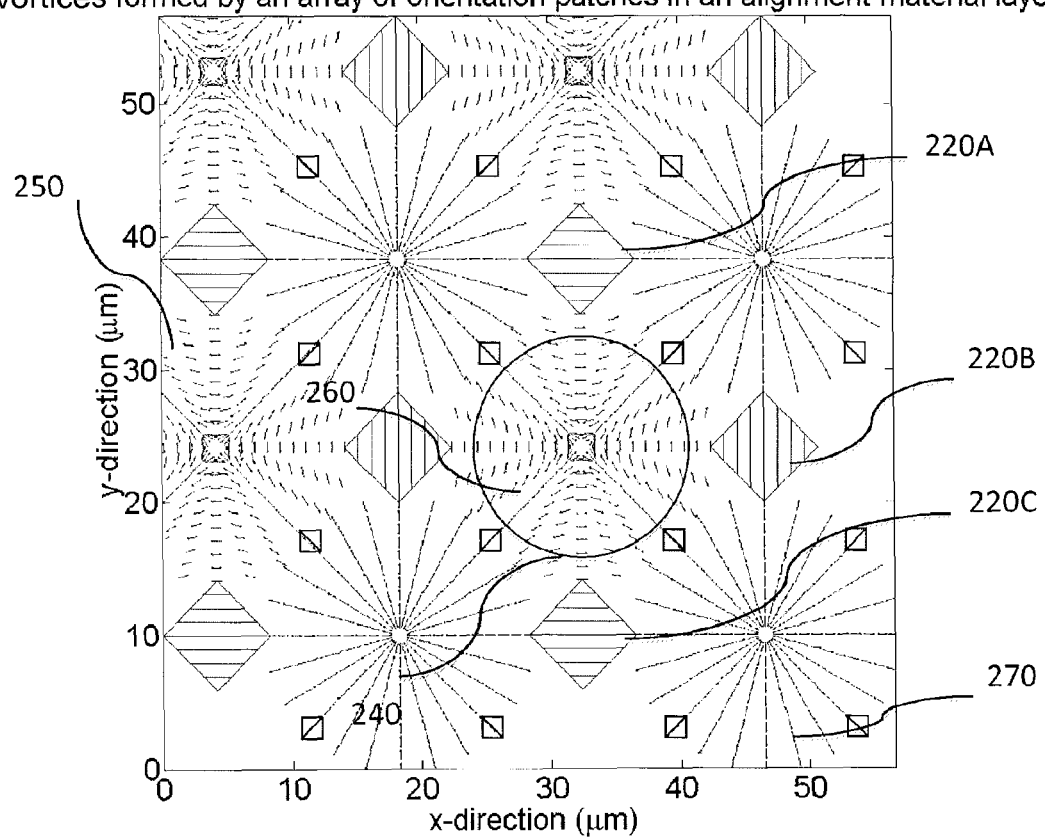
FIG. 7B illustrates an embodiment of an array of m=±2 optical vortex retarders formed in a LC or LCP layer using the alignment pattern illustrated in FIG. 7A, wherein the "vector lines" represent an axis (i.e. fast axis or slow axis) of the birefringent material (e.g., LC or LCP layer), and wherein the underlying alignment pattern is shown for reference purposes.

Referring also to FIG. 7B, each of the discrete alignment patches 220A, 220B, 220C, 220D, 225A, 225B, 225C, 225D is strategically oriented, sized, shaped, and/or located to cause the LC or LCP precursor layer 250 disposed above/adjacent to the alignment layer 210 to create the array of m=2, m=−2 optical vortex retarders. In particular, the second plurality of discrete alignment areas or patches 225A, 225B, 225C, 225D is disposed to induce the correct sense of alignment rotation within each vortex retarder, thus avoiding frustrations within the array (e.g., wherein the sense of rotation of the fast axis is reversed within a portion of a vortex retarder).

Figure 8A:
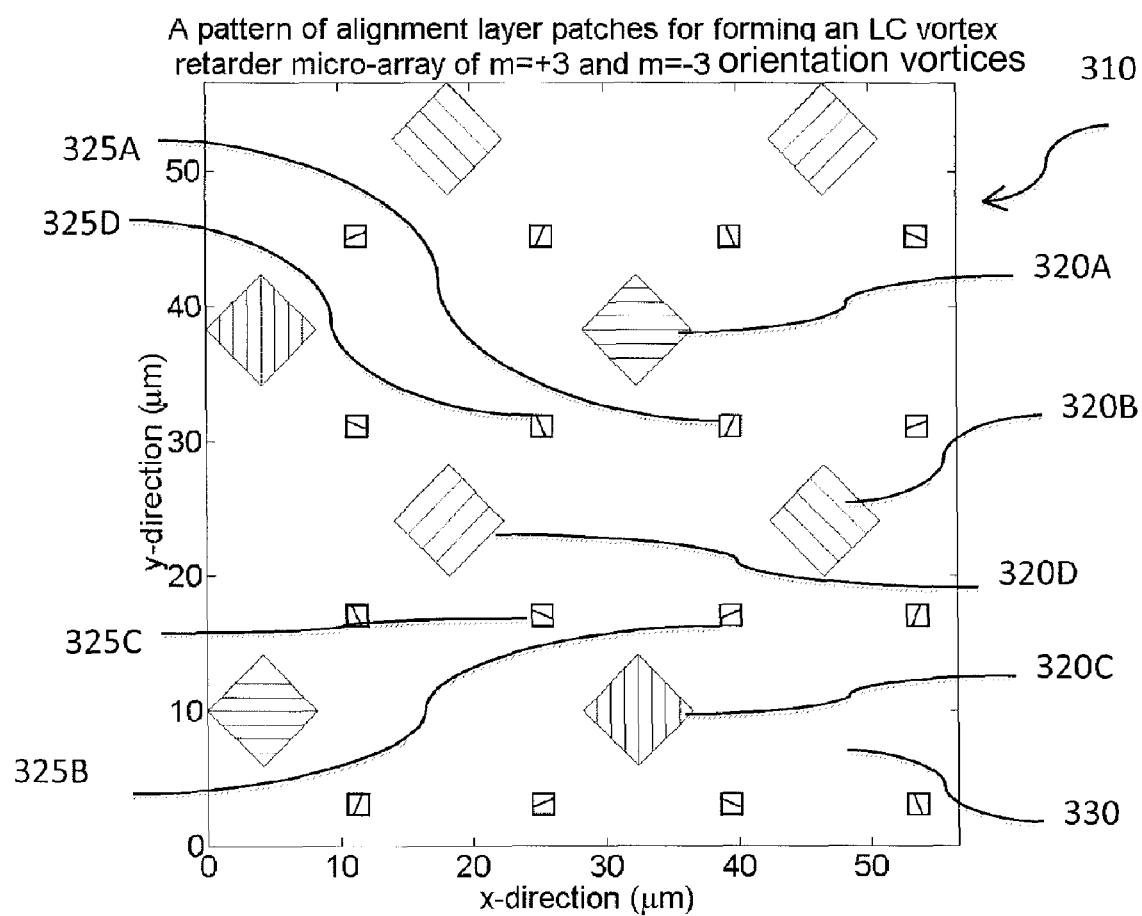
FIG. 8A illustrates one embodiment of an alignment pattern for producing an array of m=±3 vortices including a secondary set of alignment patches, wherein the orientation in each patch is indicated by the lines drawn within it.

Referring to FIG. 8A, there is shown a schematic diagram of an alignment layer for creating an array of optical vortex retarders in an adjacent LC or LCP layer, in accordance with another embodiment of the instant invention. The alignment layer 310 includes a first plurality of discrete alignment areas or patches 320A, 320B, 320C, 320D and a second plurality of discrete alignment areas or patches 325A, 325B, 325C, 325D, each of which is interspersed in a substantially non-oriented region 330. Each alignment patch has a fixed aligning orientation that differs from the fixed aligning orientation of one or more other alignment patches. In particular, the first plurality of discrete alignment patches 320A, 320B, 320C, 320D includes four dissimilar aligning orientations, whereas the second plurality of discrete alignment patches 325A, 325B, 325C, 325D includes four more dissimilar aligning orientations. Notably, the area between the discrete alignment patterns (e.g., the substantially non-oriented region 330), including the interstitial region 340 between the discrete alignment patches, has no preferred aligning orientation.

Figure 8B:
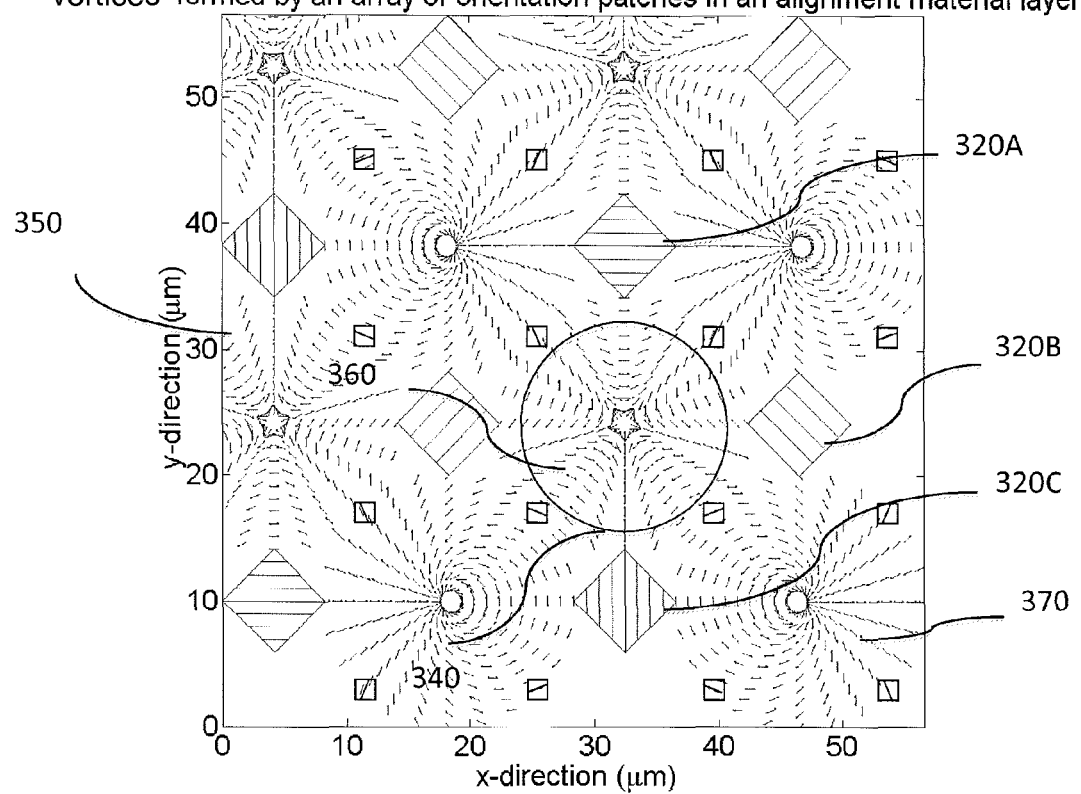
FIG. 8B illustrates an embodiment of an array of m=±3 optical vortex retarders formed in a LC or LCP layer using the alignment pattern illustrated in FIG. 8A, wherein the "vector lines" represent an axis (i.e. fast axis or slow axis) of the birefringent material (e.g., LC or LCP layer), and wherein the underlying alignment pattern is shown for reference purposes.

Referring also to FIG. 8B, each of the discrete alignment patches 320A, 320B, 320C, 320D, 325A, 325B, 325C, 325D is strategically oriented, sized, shaped, and/or located to cause the LC or LCP precursor layer 350 disposed above the alignment layer 310 to create an array of optical vortex retarders. For example, each of the discrete alignment patches 320A, 320B, 320C, 320D is used to locally anchor the alignment of the overlying/adjacent LC or LCP precursor layer 350 and to induce the LC or LCP material above/adjacent to the non-oriented interstitial region 340 to form a vortex retarder 360. Although the LC or LCP material 350 over each alignment patch 320A, 320B, 320C, 320D generally has the same orientation as the underlying alignment patch, some deviation is expected near the patch edges so that there is a smooth fast axis transition at the boundaries of the patches. The second plurality of discrete alignment areas or patches 325A, 325B, 325C, 325D helps to induce the correct sense of alignment rotation within each vortex retarder, thus avoiding frustrations within the array (e.g., wherein the sense of fast axis rotation is reversed within a portion of the vortex retarder). Notably, this pattern of alignment patches is shown to create an array of m=3 and m=−3 optical vortex retarders. For example, optical vortex retarder 360 is an m=−3 vortex retarder, whereas optical vortex retarder 370 is an m=3 optical vortex retarder.

Figure 9A:
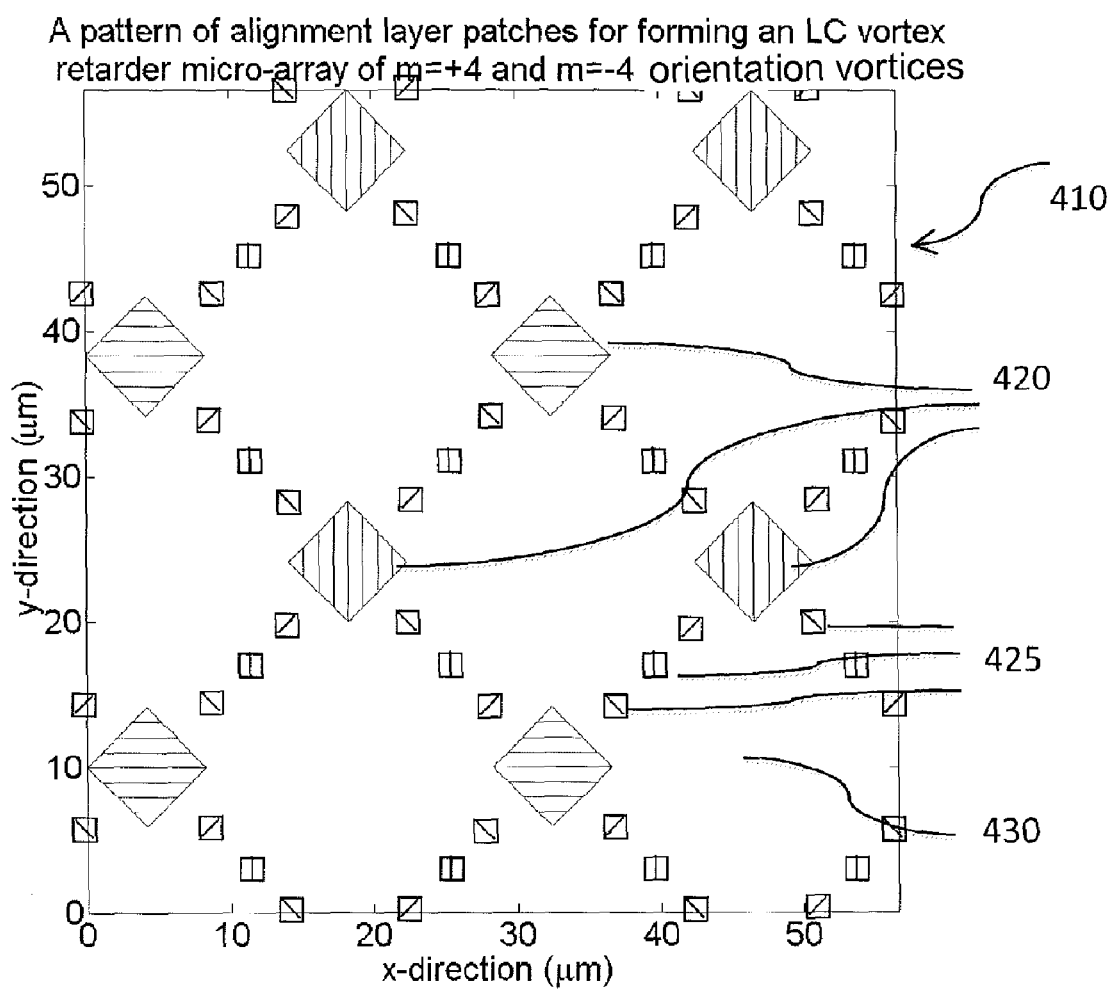
FIG. 9A illustrates one embodiment of an alignment pattern for producing an array of m=±4 vortices including a secondary set of alignment patches, wherein the orientation in each patch is indicated by the lines drawn within it.

Referring to FIG. 9A, there is shown a schematic diagram of an alignment layer for creating an array of optical vortex retarders in an adjacent LC or LCP layer, in accordance with another embodiment of the instant invention. The alignment layer 410 includes a first plurality of discrete alignment areas or patches 420 and a second plurality of smaller discrete alignment areas or patches 425, both of which are interspersed in a substantially non-oriented region 430. Each alignment patch in the first 420 and second 425 pluralities has a fixed aligning orientation that differs from the fixed aligning orientation of one or more other alignment patches. The area between the discrete alignment patterns (e.g., the substantially non-oriented region 430), including the interstitial region between the first plurality of discrete alignment patches, has no preferred aligning orientation.

Figure 9B:
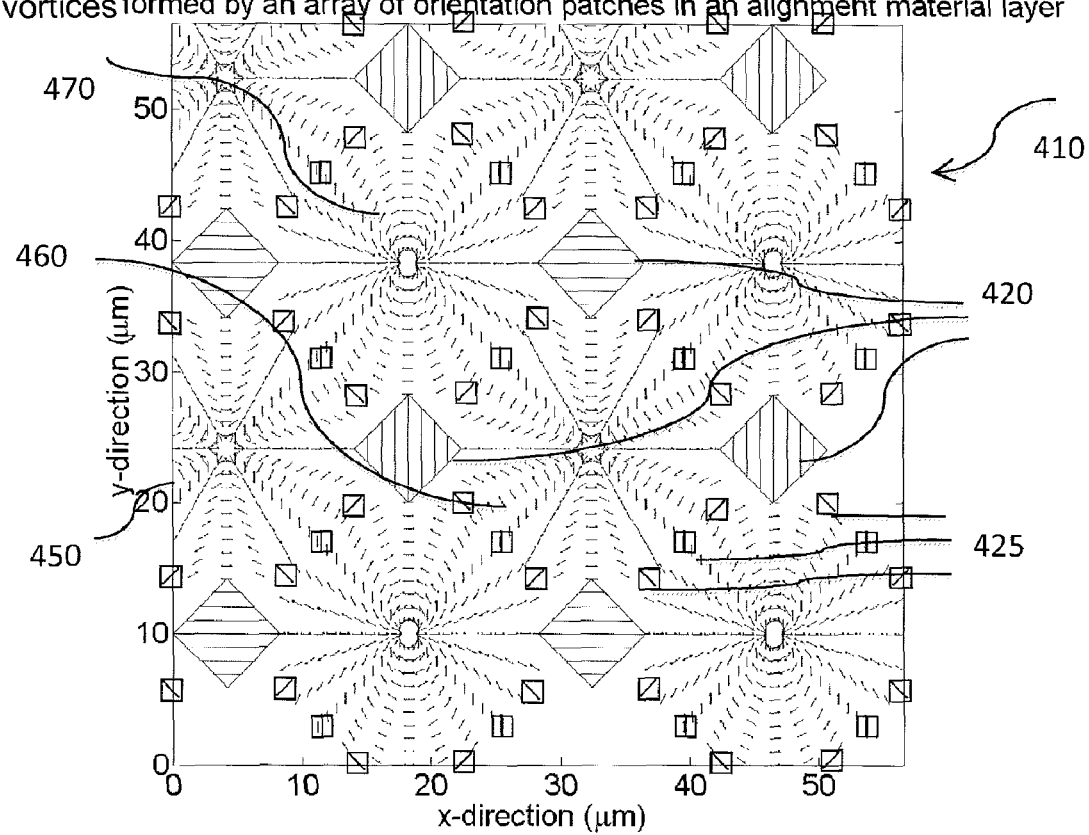
FIG. 9B illustrates an embodiment of an array of m=±4 optical vortex retarders formed in a LC or LCP layer using the alignment pattern illustrated in FIG. 9A, wherein the "vector lines" represent an axis (i.e. fast axis or slow axis) of the birefringent material (e.g., LC or LCP layer), and wherein the underlying alignment pattern is shown for reference purposes.

Referring also to FIG. 9B, each of the discrete alignment patches in the first 420 and second 425 pluralities is strategically oriented, sized, shaped, and/or located to cause the LC or LCP precursor layer 450 disposed above/adjacent to the alignment layer 410 to create an array of optical vortex retarders. In particular, each of the discrete alignment patches in the first plurality of discrete alignment patches 420 is used to locally anchor the alignment of the overlying/adjacent LC or LCP precursor layer 450 and to induce the LC or LCP material above/adjacent to the non-oriented interstitial region between the first plurality of discrete alignment patches to form a vortex retarder 460. Each of the discrete alignment patches in the second plurality of discrete alignment areas 425 helps to induce the correct sense of alignment rotation within each vortex retarder, thus avoiding frustrations within the array (e.g., wherein the sense or rotation is reversed within a portion of the vortex retarder). Notably, this pattern of alignment patches is shown to create an array of m=4 and m=−4 optical vortex retarders. For example, optical vortex retarder 460 is an m=−4 vortex retarder, whereas optical vortex retarder 470 is an m=4 optical vortex retarder.

Note that while the secondary alignment patches 325A and 425 may help to reduce frustrations in the array, in each of the above embodiments there may be areas within or around the micro-array showing irregular alignment, random alignment, uniform alignment, defects, dislocations, isotropic LC phase, or absence of LC material.

Advantageously, each of the optical vortex retarder arrays illustrated in FIGS. 5B, 6B, 7B, 8B, and 9B includes a design that easily controlled and optimized simply by changing the orientation of the discrete alignment patches. In other words, this method of creating an array of optical vortex retarders is easy to control and optimize regardless of the array designs/modes.

Further advantageously, the optical vortex retarder arrays illustrated in FIGS. 5B, 6B, 7B, 8B, and 9B include alternating +/− mode vortices. For example, FIG. 5B shows alternating +1/−1 mode optical vortex retarders, whereas FIG. 6B shows alternating +2/−2 mode optical vortex retarders. Preserving +/− mode neutrality is believed to provide a stable vortex array that is free of alignment conflict and/or frustrations.

Notably, the alignment patterns illustrated in FIGS. 5A, 6A, 7A, 8A, and 9A exploit the nature of optical vortex retarder arrays. For example, the alignment patterns are designed such that each discrete alignment patch is used to help create four different vortices (e.g., at each patch location, four neighboring vortices tend toward a common alignment orientation). In addition, the singularity point of each vortex retarder, wherein the orientation of the fast axis is substantially undefined, is conveniently centered at the center of each interstitial region (e.g., at each interstitial point).

Figure 10A:
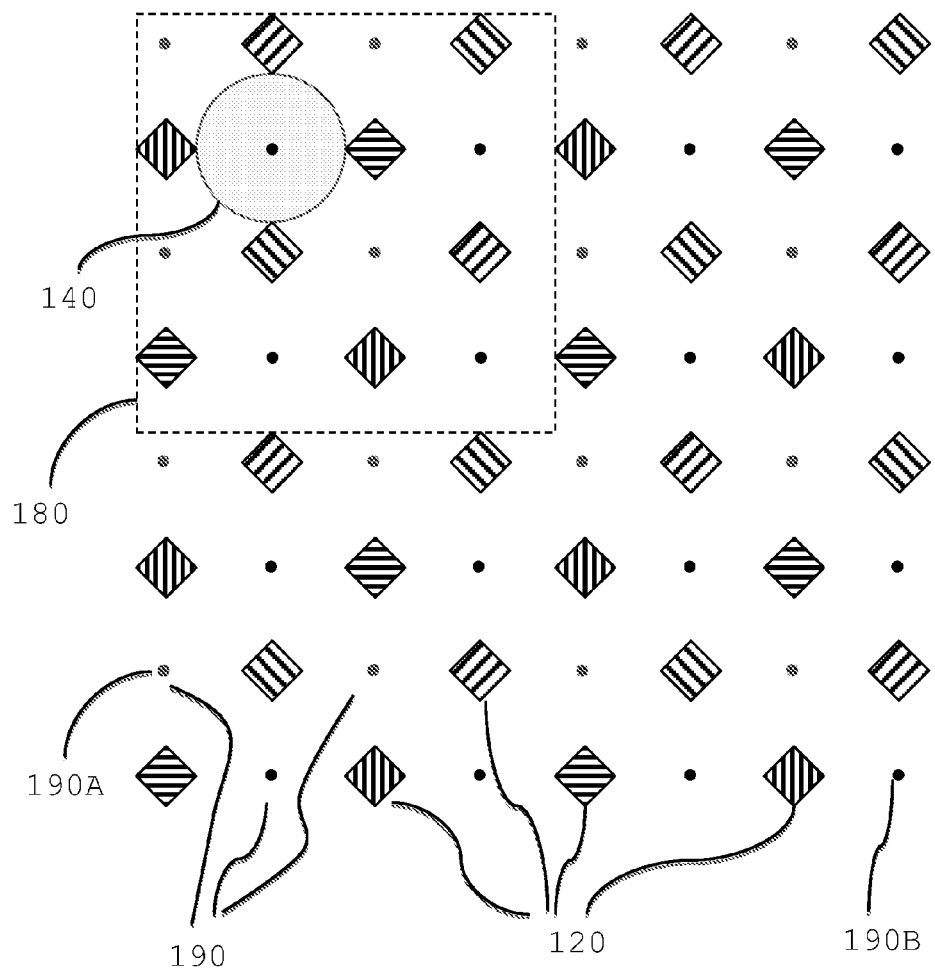
FIG. 10A shows the unit cell of the arrangement of oriented alignment patches illustrated in FIG. 5A.
Figure 10B:
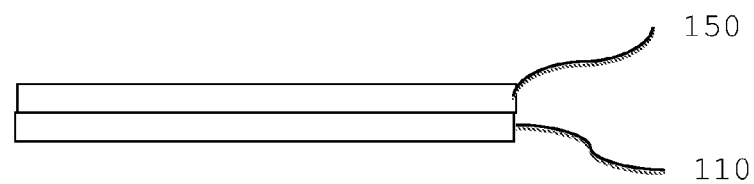
FIG. 10B is a cross-section view of the alignment layer and adjacent LC or LCP layer illustrated in FIGS. 5A and 5B, respectively.

Referring to FIG. 10A, which shows a larger area of the alignment pattern illustrated in FIG. 5A, it is clear that the plurality of discrete alignment patches 120 is distributed along a grid. More specifically, the plurality of discrete alignment patches 120 is distributed at periodic intervals corresponding to the lattice points of a square lattice such that each discrete alignment patch is surrounded by four closest neighbors. In addition, it is clear from FIG. 10A that the orientations of the plurality of discrete alignment patches 120 also has a predetermined pattern. The unit-cell 180 of this 2D pattern includes an arrangement of square-shaped patches, alternating in alignment orientation between 0°, 90°, −45° (or 135°, and 45°. As discussed above, this 2D pattern, wherein orientation directions are indicated by the hatched lines within the patches, was selected to provide boundary conditions for a subsequently deposited LC or LCP layer to create an array of alternating m=−1 and m=+1 vortex retarders that are centered at the interstitial points 190. More specifically, this pattern provides an alternating vortex arrangement wherein m=−1 vortices (centered at the light coloured points 190A) alternate with the m=1 vortices (centered at the dark coloured points 190B) in a checkerboard fashion.

The quality of the array of optical vortex retarders will be determined, at least in part, by the geometry of the unit cell 180. If the diameter of the circular interstitial region 140 bounded by the corners of the four closest square alignment patches is termed the vortex diameter, V, the dimension of each square alignment patch (i.e., length and width) is P, the diagonal dimension of each square alignment patch is D, and the dimension (i.e., length and width) of each unit cell is U, then the geometry of the unit cell may be defined by:

$$D=3*((V/2)/(\cos(45*\pi/180))-(V/2)) \tag{2}$$

$$U=3*V+2*D \tag{3}$$

$$P=D/\sqrt{2} \tag{4}$$

For example if a vortex retarder having a diameter V of 20 microns is desired, then the diagonal dimension of each alignment patch D would typically be about 8.2 microns, the length and width of the unit cell U would typically be about 56.6 microns, and the length and width of each alignment patch P would typically be about 5.8 microns.

In general, the size of the interstitial region, V, and hence the size of the vortex retarders, will be somewhat limited. If the interstitial region is too large, the alignment patches will not be able to force the LC or LCP into the desired alignment. For example, in this case, the LC or LCP material would have the freedom to deviate from the desired vortex alignment, possibly aligning irregularly or forming more than one vortex per interstice. If the interstitial region is too small, the LC may not be able to follow the alignment pattern that is trying to be forced, because the LC or LCP can not make sharp transitions in orientation.

Figure 11:
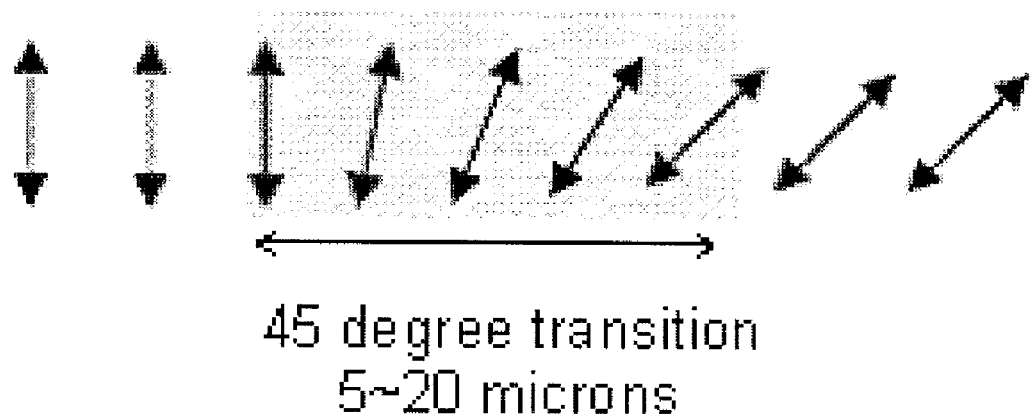
FIG. 11 illustrates the 45 degree transition of a LCP material over 5 to 20 microns.

The exact range of possible vortex retarder size will be dependent on various parameters, including the type of LC or LCP material used. For example, vortex retarder arrays based on a LCP material that transitions between two adjoining alignment regions differing by 45 degree in alignment direction over 5~20 microns (e.g., as illustrated in FIG. 11) have been modelled to have the parameter defined by (V+D)/2 in the range from about 5 to 20 microns. Experimentally, a 1-D array of vortex retarders based on the same LCP material wherein each vortex retarder has a diameter between about 15 and 30 microns has been observed.

In addition, the vortex retarder size will be dependent on the LC material's viscosity and layer thickness. If the layer thickness it too great, LC alignment may deviate from ideal in the vertical direction. If viscosity is too low, the LC between the patches will have more freedom to deviate from desired alignment behaviour. If viscosity is too high, the LC may be kinetically hindered from organizing into the preferred direction at each location. In general, the layer thickness will be selected such that the optical vortex retarders provide the required retardance (e.g., Γ=Δnd, where d is the layer thickness). For example, in one embodiment the array of optical vortex retarders is configured as a halfwave plate at an optical wavelength of 540 nm.

Notably, while the primary alignment patches (i.e., larger squares including 120A-D, 220A-D, 320A-D, and 420) in the above described embodiments have been shown to be distributed at periodic intervals corresponding to the lattice points of a square lattice, it is also within the scope of the instant invention to distribute these discrete alignment patches at periodic intervals corresponding to another 2D lattice type. For example, in one embodiment the primary alignment patches are distributed at periodic intervals corresponding to the lattice points of a hexagonal lattice. In this embodiment, each optical vortex retarder is also centered at a lattice point so that it is surrounded by six equidistant discrete alignment patches. In fact, various embodiments wherein the alignment patches are centered on a square grid (e.g., checkerboard), triangular grid, hexagonal grid, or a grid composed by tiling two or more types of regular polygons (i.e. squares and octagons), are envisaged.

In addition, while the primary alignment patches (i.e., larger squares including 120A-D, 220A-D, 320A-D, and 420) have been illustrated as having a square shape, it is also within the scope of the instant invention for the primary alignment patches to be designed with other shapes. For example, in other embodiments the primary alignment patches are designed as crosses, circles, 4-pointed stars, or combinations thereof. Those skilled in the art will understand that the geometric relationships governing the unit-cell dimension, patch dimension, and interstitial region may be re-evaluated based on the patch shape and LC or LCP material selected.

Also, while the micro-array of optical vortex retarders illustrated in FIGS. 5B, 6B, 7B, 8B, and 9B, have been shown having alternating rows of opposite sense same mode vortices (e.g., rows of m=−1 vortices alternating with rows of m=1 vortices), it is also within the scope of the instant invention to provide other combinations. For example, in one embodiment the micro-array of optical vortex retarders includes m=−1 vortices, m=+1 vortices, and hybrid m=±1 vortices. A hybrid m=±1 vortex is defined as a vortex retarder that is m=+1 in two of four quadrants and m=−1 in the other two quadrants.

Figure 12:
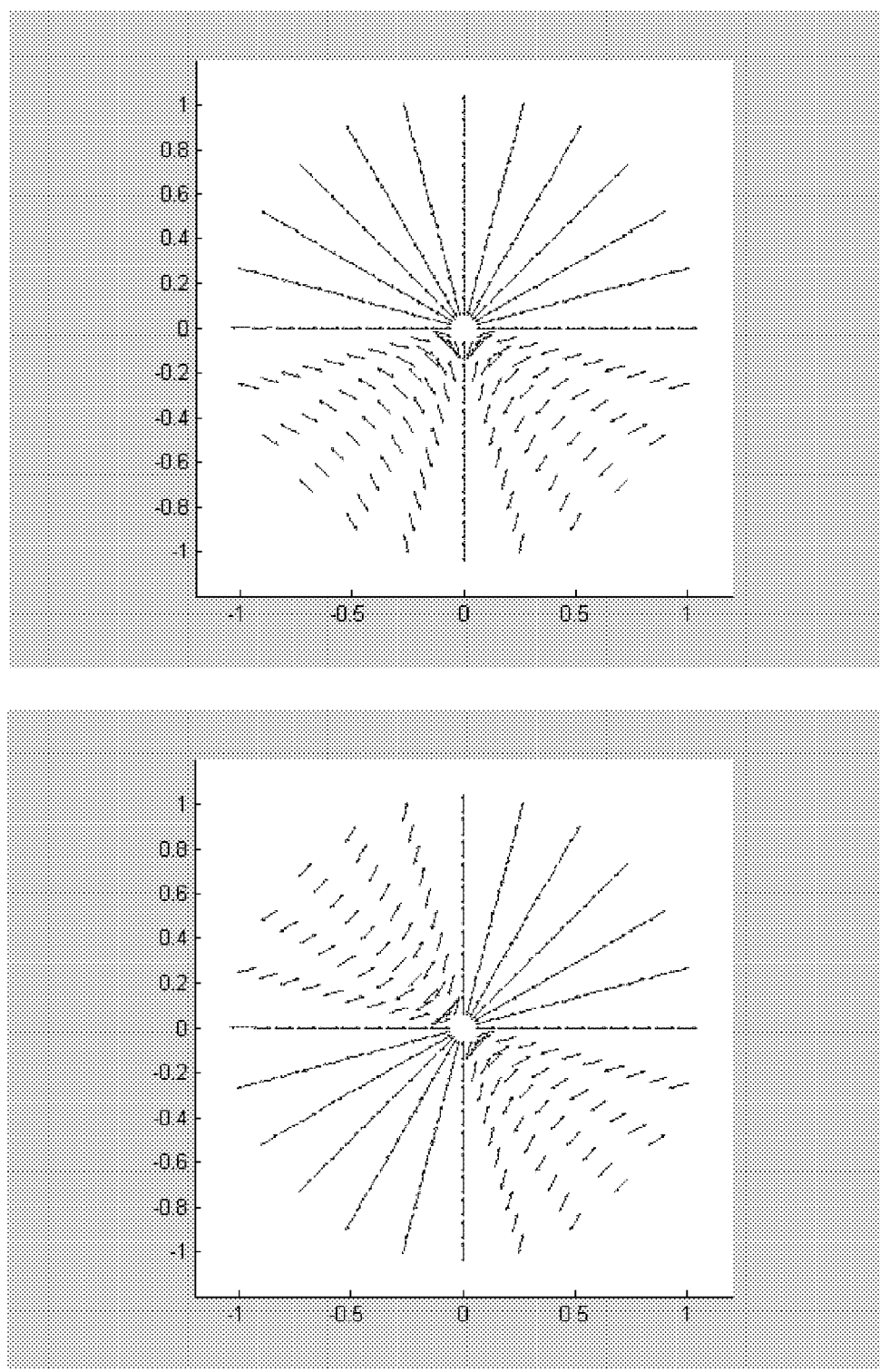
FIG. 12 illustrates two different embodiment of a hybrid m=±2 optical vortex retarder.
Figure 13:
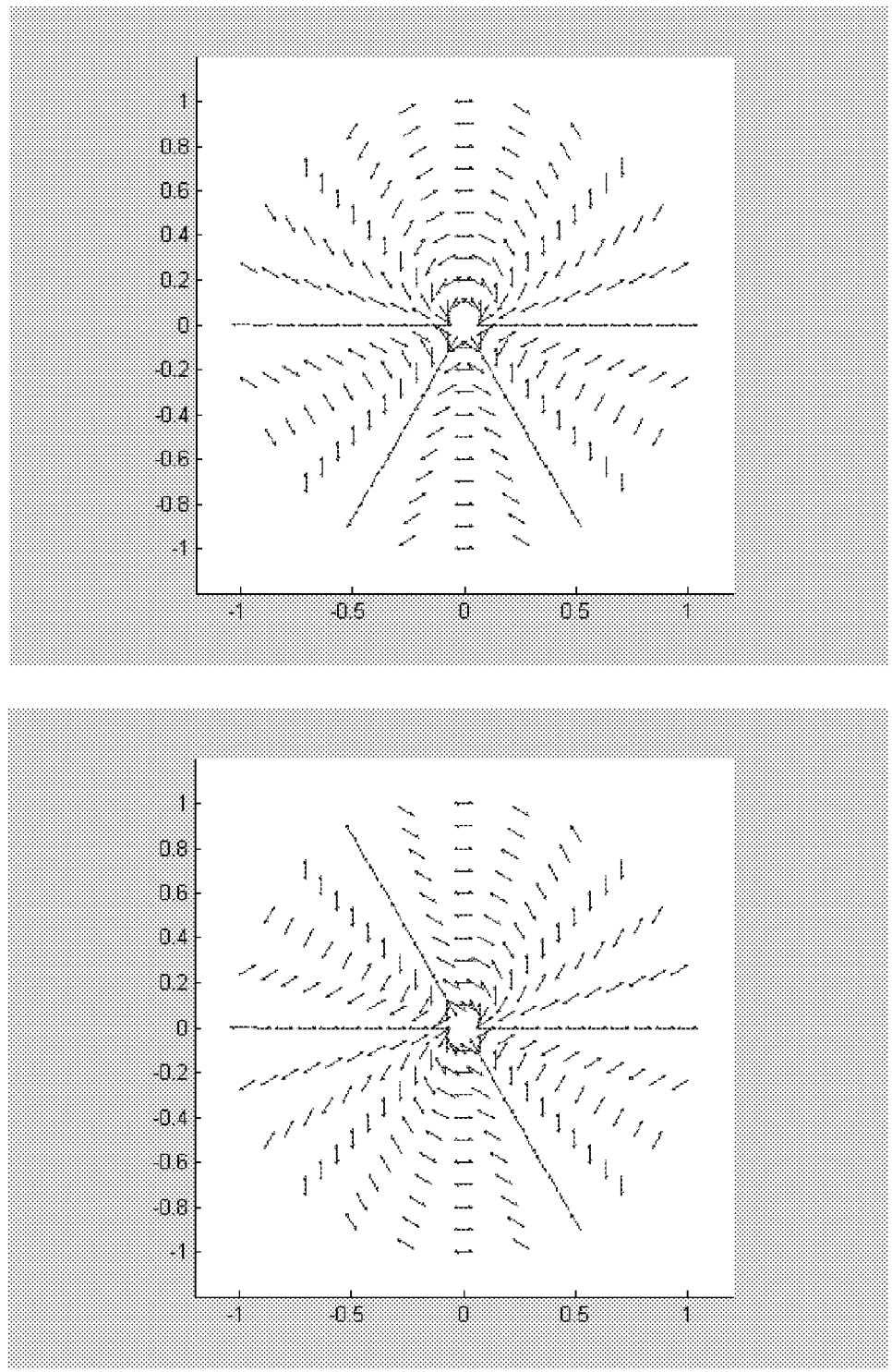
FIG. 13 illustrates two different embodiment of a hybrid m=±4 optical vortex retarder; and, FIG. 14 illustrates the modeled vortex alignment of a 3×3 array of the unit cell illustrated in FIG. 10A.

Referring to FIGS. 12 and 13, there are shown embodiments of hybrid m=±2 and m=±4 optical vortex retarders, respectively, where the plotted arrows represent an axis of a birefringent material (e.g., fast axis or slow axis). In the embodiment illustrated in the top half of FIG. 12, the top half of the vortex retarder is m=+2, whereas the bottom half of the vortex retarder is m=−2. In the embodiment illustrated in the bottom half of FIG. 12, the four quadrants of hybrid vortex retarder alternate between m=+2 and m=−2. Similarly, in the embodiment illustrated in the top half of FIG. 13, the top half of the vortex retarder is m=+4, whereas the bottom half of the vortex retarder is m=−4. In the embodiment illustrated in the bottom half of FIG. 13, the four quadrants of hybrid vortex retarder alternate between m=+4 and m=−4.

Figure 14:
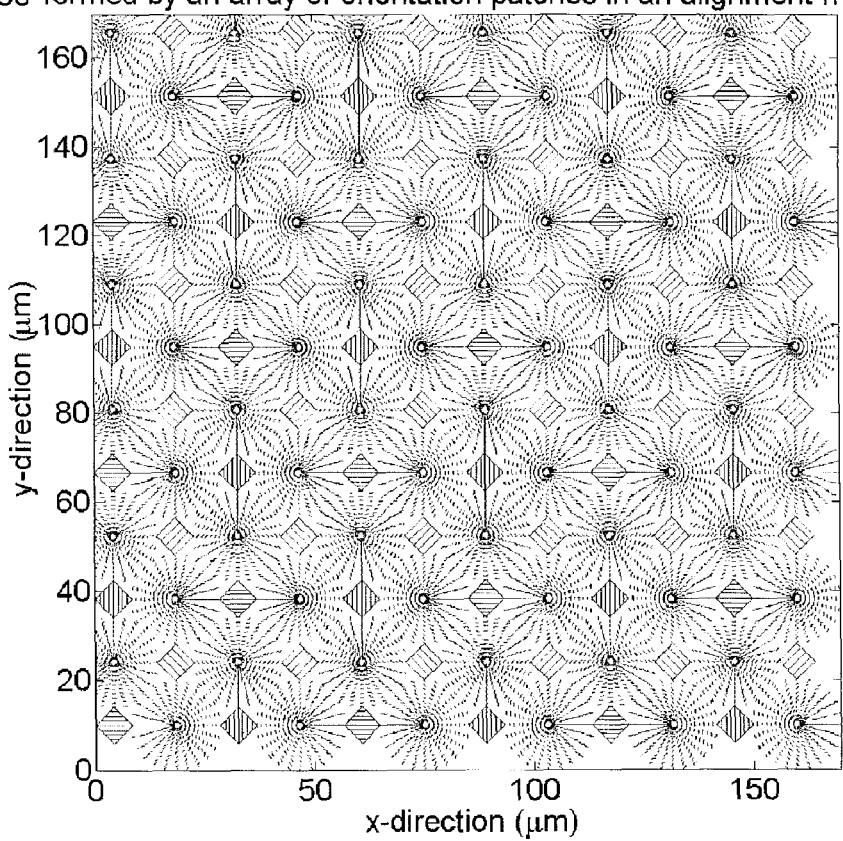

Advantageously, the 2D patterns discussed above and illustrated in FIGS. 5A, 6A, 7A, 8A, 9A, and 10 can provide relatively large arrays of optical vortex retarders. For example, referring to FIG. 14, a 3×3 array of the unit-cell 180 illustrated in FIG. 10A is shown. Notably, these large and relatively complex patterns are formed using a relatively simple fabrication process. In particular, the plurality of discrete alignment patches is fabricated with a simple yet accurate method of providing linear orientation in an alignment layer. The more complex optical vortex retarders are fabricated using these linearly aligned patches by allowing a LC or LCP material deposited thereon to take an orientation that is influenced by the discrete alignment patches and/or by any orientation resulting therefrom (e.g., the orientation of the LC or LCP material over/adjacent to a non-oriented region will be influenced by the orientation of the laterally neighbouring LC or LCP material). Accordingly, relatively complex patterns are provided with a relatively simple fabrication process.

One method of preparing the alignment layers discussed above is to use a photolithographic photoalignment technique. For example, in one embodiment the alignment layer is prepared as follows.

First a layer of linearly polymerizable photopolymer (LPP) is coated on a transparent substrate (e.g., a 2×2 inch glass substrate). For example in one embodiment, the LPP layer is formed by spin-coating a 2 wt % solution of a LPP in cyclopentanone on a glass substrate (e.g., for 60 seconds at 3000 RPM) to obtain a 50 nm thick alignment layer. In other embodiments, the LPP layers are formed using another coating method such as wire-coating, gravur-coating, slot-coating, etc. The LPP is a material, which when exposed to linearly polarized ultraviolet (LPUV) light, polymerizes such that the molecular orientation of the polymer is parallel to the incident polarization (i.e., the molecular orientation is set in a uniform direction determined by the orientation of the incident light). LPP layers, which often include cinnamic acid derivatives and/or ferulic acid derivatives, are well known in the art. One example of a suitable LPP is ROLIC LPP ROP108/2CP, available from ROLIC Technologies. Another example of a LPP material is polyvinyl 4-methoxy-cinnamate ("PVMC"). The LPP coated substrate is optionally baked (i.e., annealed) for several minutes at temperatures between 150 and 200 degrees Celsius to stabilize the LPP layer and/or remove excess solvent from the spin-coating process. Optionally, an adhesion promoter such as a silane coupling agent is applied to the substrate before the LPP is coated thereon. Further optionally, the transparent substrate supporting the LPP layer will include a broadband anti-reflective (AR) coating on the back surface thereof.

Secondly, the LPP coated substrate is irradiated through a stationary photomask using LPUV at a wavelength suitable for selectively polymerizing the LPP layer (e.g., at a wavelength between 280 and 365 nm if the LPP is ROLIC LPP ROP108/2CP). For example, in one embodiment a substrate coated with a 50 nm thick ROLIC LPP ROP108/2CP layer is irradiated with LPUV light at about 300 to 340 nm, at normal incidence, with an energy density of 12 mJ/cm$^2$, for 10 seconds. In general, the photomask will have a plurality of apertures arranged on a grid pattern, where the shape of each aperture is selected to provide the desired shape of the discrete alignment patches (e.g., square for the pattern illustrated in FIG. 5A). For example, in one embodiment, the photomask is a solid metal plate including a plurality of square cut-outs. In another embodiment, the photomask includes a transparent substrate having an opaque layer, such as chrome, coated/sputtered thereon and patterned in a predetermined pattern by etching to provide the plurality of apertures. As the LPP layer is irradiated through the photomask, small patches of the alignment layer will have the orientation set therein, whereas the unexposed areas (i.e., the masked areas) remain non-oriented. In order to obtain small patches of alignment layer having a different orientation, the irradiated LPP coated substrate is subject to another irradiation step with LPUV light having a different polarization orientation. The second irradiation step is performed through a different photomask, or through the same photomask after it has been shifted laterally (e.g., to provide a linear translation). For example, in one embodiment the LPP coated substrate is irradiated through the photomask with LPUV light having a first polarization, the mask is moved such that the position of the plurality of apertures is offset a predetermined amount, and then the LPP layer is irradiated with LPUV light having a second polarization orientation (e.g., the mask is offset by a predetermined number of micrometers in X any Y directions between exposures). Depending on the desired alignment pattern, the steps of rotating the polarization of the LPUV light and shifting the photomask will be repeated a number of times. For example, in order to provide the alignment pattern illustrated in FIG. 5A the orientation of the LPUV light would need to be rotated (e.g., with a waveplate and/or polarizer) four times, while the photomask is shifted four times. In contrast, in order to provide the alignment pattern illustrated in FIG. 6A, each of the orientation of the LPUV light and the position of the photomask would only need to be switched two times. Alternatively, small patches of alignment layer having a different orientation is obtained with a stationary mask and LPUV light source, while the substrate is rotated between irradiation steps (e.g., only one 90 degree rotation of the substrate would be required to form the 2D pattern illustrated in FIG. 6A).

Another method of preparing an alignment layer having a plurality of discrete alignment patches is to use a direct laser writing (DLW) technique. For example in one embodiment, a LPP layer is coated on a transparent substrate as described above, but rather than irradiating it through a photomask it is subject to a maskless direct laser writing technique in which a polarized UV laser beam is used to selectively expose the LPP layer at each patch location with the appropriate polarization direction.

Yet another method of preparing an alignment layer having a plurality of discrete alignment patches is to use a rubbing technique. One example of an alignment material that orients in a rubbing direction when mechanically rubbed is a polyimide. Polyimide alignment layers are well known in the art and may be deposited by spin-coating, wire-coating, gravur-coating, slot-coating, etc. Optionally, the polyimide layer is baked (e.g., at 180-220 degrees Celsius for about 1 hour) prior to the mechanical rubbing. In one embodiment, the plurality of discrete alignment patches is formed using a micro-rubbing technique, wherein the alignment patches are individually rubbed with a small rubbing tool. In another embodiment, the plurality of discrete alignment patches is created by forming a resist layer that has a plurality of apertures distributed in a predetermined 2D pattern on top of the alignment layer, rubbing the resist covered alignment layer with a synthetic felt cloth, and removing the resist layer.

Once the alignment layer having a plurality of discrete alignment patches has been formed, the alignment layer is then coated with a LC or LCP precursor material to a specific thickness to obtain a desired retardance. If a non-polymer LC material is employed, then a counter substrate typically will be used to form a LC cell. For example, in one embodiment, the counter substrate also includes an alignment layer having a 2D pattern of discrete alignment patches that mirrors that of the first substrate. If a LCP precursor material is employed, which may include liquid crystalline monomers, oligomers, or polymers having cross-linkable groups, a single substrate typically will be used. In addition, if a LCP precursor is employed further processing steps may include annealing, UV curing, baking, lamination, and/or the coating of additional layers. Both LC and LCP precursor materials are known in the art and may exhibit a nematic, smectic, or cholesteric phase. For example, the cross-linkable liquid crystal material of the LCP material may exhibit a nematic, smectic, or cholesteric phase. One example of a suitable LCP precursor material includes a cross-linkable diacrylate nematic liquid crystalline compound, which is polymerized and/or cross-linked thermally and/or with UV irradiation (not necessarily polarized). One LCP precursor that is particularly well suited for use with LPP layers formed using ROLIC LPP ROP108/2CP is ROF5151, also available from Rolic, which is cured with UV light to cross-link the LCP precursor and form the LCP layer (i.e., fixing the orientation of the LCP vortex array).

If the LC or LCP material is applied with a thickness d such that the product of $\Delta n \cdot d$ is 0.5 at the wavelength of interest $\lambda$, where $\Delta n$ is the in-plane birefringence, then each vortex retarder in the array is a half-wave vortex retarder. In this case, the LC or LCP material is configured as an A-plate. Of course, it is also within the scope of the instant invention to employ O-plate type LC materials.

The optical vortex retarder micro-arrays discussed above have potential for use in micro-lithography, driving microoptomechanical pumps, and processing quantum information. For example, a network of vortices is expected to be useful in the measurement of rotation angle, small linear displacement, and in superresolution microscopy, 3D scanning interferometry. In addition, the structured light potential energy landscape provided by the vortex retarder arrays may provide novel types of optical traps.

One particularly useful application of vortex retarders is the encoding of information in the orbital angular momentum states of the light beam, which is done by creating a polarization vortex of a given order and then transmitting the beam. The order of the beam can be maintained over significant propagation distances and is easily reconstructed. In the case of an array of periodic array of vortex retarders, information can be encoded in each vortex retarder location. This can work for periodic arrays with two orders (say +1 and −1). For the case where multiple orders can be produced, the amount of information that can be transmitted in a single beam increases exponentially.

Another application of optical vortex retarder arrays includes manipulating small particles. It is well known that optical vortices create angular momentum. Accordingly, an array of optical vortices, which when designed correctly, can be used to transport small particles. One example is the creation of a microfluidic pump based on arrays of optical traps in which each vortex is combined with a high numerical aperture lens creates a trapping region that can transport fluid microscopically.

Of course, the above embodiments and applications have been provided as examples only. It will be appreciated by those of ordinary skill in the art that various modifications, alternate configurations, and/or equivalents will be employed without departing from the spirit and scope of the invention. For example, although various periodic and regular 2D patterns have been shown it is also within the scope of the instant invention to use non-regular patterns. In addition, while the vortex retarders described above have been part of a 2D array of optical vortex retarders it is also within the scope of the invention to form a 1D array, or even a single micro-sized vortex retarder. Accordingly, the scope of the invention is therefore intended to be limited solely by the scope of the appended claims.

The invention claimed is:

1. A method of making an optical vortex retarder comprising:
    forming an alignment layer having a first plurality of discrete alignment patches, the first plurality of discrete alignment patches including a first alignment patch having a first aligning orientation and a second alignment patch having a second other aligning orientation; and,
    providing a layer of birefringent material adjacent to the alignment layer, the birefringent material including one of a liquid crystal material and a liquid crystal polymer precursor material,
    wherein an aligning orientation and position of each discrete alignment patch in the first plurality of discrete alignment patches is selected to induce the layer of birefringent material to form at least one optical vortex retarder adjacent to a substantially non-oriented region of the alignment layer.

2. The method according to claim 1,
wherein the position of each discrete alignment patch in the first plurality of discrete alignment patches is selected such that each discrete alignment patch is distributed at a lattice point of a two-dimensional lattice,
and wherein the aligning orientation of each discrete alignment patch in the first plurality of discrete alignment patches is selected such that a fast axis of the layer of birefringent material rotates about at least one interstitial point of the two-dimensional lattice for a closed path within an interstitial region traced around the interstitial point.

3. The method according to claim 2, wherein the at least one optical vortex retarder includes a two-dimensional array of optical vortex retarders.

4. The method according to claim 3, wherein the two-dimensional array of optical vortex retarders includes alternating rows of opposite sense same mode optical vortex retarders.

5. The method according to claim 3, wherein the two-dimensional lattice is a square lattice, and wherein each optical vortex retarder is disposed adjacent to a substantially non-oriented region of the alignment layer centered between four discrete alignment patches in the first plurality of alignment patches, each of the four discrete alignment patches having one of four different aligning directions.

6. The method according to claim 5, wherein the four different aligning directions include 0 degrees, 45 degrees, 90 degrees, and 135 degrees relative to an arbitrary reference angle.

7. The method according to claim 3, wherein the two-dimensional lattice is a square lattice, and wherein each optical vortex retarder is disposed adjacent to a substantially non-oriented region of the alignment layer centered between four discrete alignment patches in the first plurality of alignment patches, each of the four discrete alignment patches having one of two different aligning directions.

8. The method according to claim 7, wherein the two different aligning directions include 0 degrees and 90 degrees relative to an arbitrary reference angle.

9. The method according to claim 1, wherein forming the alignment layer having the first plurality of discrete alignment patches comprises the steps of:
irradiating a linearly polymerizable photo-polymer material with linearly polarized light having a first polarization through a photomask having a plurality of apertures to provide the first alignment patch having the first aligning orientation;
moving the photomask relative to a substrate supporting the linearly polymerizable photo-polymer material; and
irradiating the linearly polymerizable photo-polymer material with linearly polarized light having a second other polarization through one of the photomask and a different photomask having a plurality of apertures to provide the second alignment patch having the second aligning orientation.

10. The method according to claim 1, wherein forming the alignment layer having the first plurality of discrete alignment patches comprises the steps of:
rubbing a polyimide layer to provide the first plurality of discrete alignment patches.

11. The method according to claim 1, wherein the birefringent material is a liquid crystal polymer precursor, and further comprising the step of irradiating the birefringent material adjacent to the alignment layer with ultra-violet light to form a liquid crystal polymer layer having the at least one optical vortex retarder.

12. The method according to claim 1, wherein the at least one vortex retarder comprises a vortex retarder having a diameter that is between about 5 microns and about 30 microns.

13. The method according to claim 1, wherein the at least one vortex retarder comprises a hybrid vortex retarder.

14. The method according to claim 1, further comprising forming a second plurality of discrete alignment patches in the alignment layer, each of the second plurality of discrete alignment patches having an aligning orientation and position selected to induce a correct rotation in the at least one optical vortex retarder.

15. The method according to claim 1, wherein the aligning orientation and position of each discrete alignment patch in the first plurality of discrete alignment patches is selected to form an array of optical vortex retarders for use in at least one of micro-lithography, microscopy, particle trapping/manipulation, driving micro-optomechanical pumps, measuring rotation angle, measuring small linear displacement, super-resolution microscopy, and three-dimensional scanning interferometry.

16. The method according to claim 1, wherein the first alignment patch is spatially separated from the second alignment patch by the substantially non-oriented region of the alignment layer, and wherein the first aligning direction is perpendicular to the second aligning direction.

17. The method according to claim 1, wherein the birefringent material includes the liquid crystal material, and wherein providing the layer of birefringent material adjacent to the alignment layer comprises sandwiching the layer of liquid crystal material between two substrates, one of the substrates including the alignment layer having the first plurality of discrete alignment patches.

18. The method according to claim 1, wherein the aligning orientation and position of each discrete alignment patch in the plurality of discrete alignment patches is selected to form an array of optical vortex retarders for use in a microfluidic pump such that each optical vortex retarder in the array is optically coupled to a high numerical aperture lens to create a trapping region for transporting fluid or particles on a microscopic scale.

19. An optical vortex retarder array comprising:
a layer of birefringent material disposed adjacent to an alignment layer, the birefringent material including one of a liquid crystal material and a liquid crystal polymer precursor material, the alignment layer having a plurality of discrete alignment patches, the plurality of discrete alignment patches including a first alignment patch having a first aligning orientation and a second alignment patch having a second other aligning orientation,
wherein an aligning orientation and position of each discrete alignment patch in the plurality of discrete alignment patches is selected to induce the layer of birefringent material to form the optical vortex retarder array, the optical vortex retarder array including at least one optical vortex retarder adjacent to a substantially non-oriented region of the alignment layer.

20. The optical vortex retarder array according to claim 19, wherein the aligning orientation and position of each discrete alignment patch in the plurality of discrete alignment patches is selected to form an array of optical vortex retarders for creating an array of polarized fields used to encode information for optical communication.

21. A method of making a micro-array of optical vortex retarders comprising the steps of:
forming an alignment layer having a first plurality of discrete alignment patches interspersed in a substantially non-oriented region, the first plurality of discrete alignment patches including a first alignment patch having a first aligning orientation and a second alignment patch having a second other aligning orientation; and, providing a layer of birefringent material adjacent to the alignment layer, the birefringent material including one of a liquid crystal material and a liquid crystal polymer precursor material, wherein an aligning orientation and position of each discrete alignment patch in the first plurality of discrete alignment patches induces the layer of birefringent material to form at least one optical vortex retarder adjacent to an interstitial region in the substantially non-oriented region of the alignment layer.

22. The method of making a micro-array of optical vortex retarders according to claim 21, wherein a width of each discrete alignment patch is less than a width of the interstitial region.

* * * * *